US012786525B2

(12) United States Patent
Hannuksela et al.

(10) Patent No.: US 12,786,525 B2
(45) Date of Patent: Nov. 3, 2026

(54) METHOD AND APPARATUS FOR ENCODING, DECODING, OR DISPLAYING PICTURE-IN-PICTURE

(71) Applicant: Nokia Technologies Oy, Espoo (FI)

(72) Inventors: Miska Matias Hannuksela, Tampere (FI); Kashyap Kammachi Sreedhar, Tampere (FI); Lukasz Kondrad, Munich (DE); Lauri Aleksi Ilola, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/856,714

(22) PCT Filed: Apr. 6, 2023

(86) PCT No.: PCT/IB2023/053557
§ 371 (c)(1),
(2) Date: Oct. 14, 2024

(87) PCT Pub. No.: WO2023/203423
PCT Pub. Date: Oct. 26, 2023

(65) Prior Publication Data

US 2025/0254403 A1 Aug. 7, 2025

Related U.S. Application Data

(60) Provisional application No. 63/363,271, filed on Apr. 20, 2022.

(51) Int. Cl.
*H04N 21/2365* (2011.01)
*H04N 5/45* (2011.01)
(Continued)

(52) U.S. Cl.
CPC ......... *H04N 21/85406* (2013.01); *H04N 5/45* (2013.01); *H04N 21/2365* (2013.01); *H04N 21/4316* (2013.01)

(58) Field of Classification Search
CPC ............... H04N 21/85406; H04N 5/45; H04N 21/2365; H04N 21/4316; H04N 21/4347;
(Continued)

(56) References Cited

U.S. PATENT DOCUMENTS 8,767,124 B2 7/2014 Zhu et al.
11,611,752 B2 * 3/2023 Wang .................... H04N 19/30
(Continued)

FOREIGN PATENT DOCUMENTS

EP 4207769 A1 * 7/2023 ........... H04N 19/172
KR 20210037287 A * 4/2021 ........... H04R 19/005
KR 20240049611 A * 4/2024 ............ H04N 21/84

OTHER PUBLICATIONS

"Versatile video coding", Series H: Audiovisual and Multimedia Systems, Infrastructure of audiovisual services—Coding of moving video, Recommendation ITU-T H.266, Apr. 2022, 536 pages.
(Continued)

*Primary Examiner* — Khanh Q Dinh
(74) *Attorney, Agent, or Firm* — ALSTON & BIRD LLP

(57) ABSTRACT

Various embodiments provide example apparatus, method, and computer program product. An example apparatus includes: receiving or generating a first encoded bitstream comprising independently encoded subpictures; receiving or generating a second encoded bitstream comprising independently encoded subpictures; wherein resolution of subpictures in the second encoded bitstream is same or substantially same as resolution of corresponding subpictures in the first encoded bitstream; generating an encapsulated file with a first track and second track, the first track comprises the
(Continued)

first encoded bitstream comprising the independently encoded subpicture, the second track comprises the second encoded bitstream comprising the independently encoded subpictures; and wherein generating the encapsulated file comprises including following information in the encapsulated file: a picture-in-picture relationship between the first track and second track; and data units independently encoded subpictures in the first encoded bitstream that are to be replaced by data units of the independently encoded subpictures of the second encoded bitstream.

16 Claims, 15 Drawing Sheets

(51) Int. Cl.
*H04N 21/431* (2011.01)
*H04N 21/854* (2011.01)
(58) Field of Classification Search
CPC .... H04N 21/845; H04N 19/70; H04N 21/816; H04N 21/8451
USPC .......................................... 709/220, 224–229
See application file for complete search history.

(56) References Cited

U.S. PATENT DOCUMENTS

| | | | | |
|---|---|---|---|---|
| 11,818,371 | B2 * | 11/2023 | Hannuksela | H04N 21/85406 |
| 2007/0195737 | A1 * | 8/2007 | Walker | H04N 21/4858 370/335 |
| 2010/0259690 | A1 * | 10/2010 | Wang | H04N 21/234327 348/716 |
| 2010/0316134 | A1 * | 12/2010 | Chen | H04N 21/2365 375/E7.2 |
| 2012/0106921 | A1 * | 5/2012 | Sasaki | H04N 21/8451 386/230 |
| 2013/0155325 | A1 * | 6/2013 | Ramamurthy | H04N 5/45 348/565 |
| 2015/0304665 | A1 | 10/2015 | Hannuksela et al. | |
| 2017/0111642 | A1 * | 4/2017 | Hendry | H04N 19/70 |
| 2017/0347026 | A1 * | 11/2017 | Hannuksela | H04N 21/8456 |
| 2018/0277164 | A1 * | 9/2018 | Wang | H04N 21/2353 |
| 2021/0037287 | A1 * | 2/2021 | Ha | G02B 27/017 |
| 2021/0203973 | A1 | 7/2021 | Skupin et al. | |
| 2021/0248810 | A1 * | 8/2021 | Liu | H04N 21/8583 |
| 2021/0314626 | A1 * | 10/2021 | Kammachi Sreedhar | H04N 21/85406 |
| 2022/0109861 | A1 * | 4/2022 | Hannuksela | H04N 21/8451 |
| 2023/0061442 | A1 * | 3/2023 | Kammachi Sreedhar | H04N 19/164 |
| 2024/0267537 | A1 * | 8/2024 | Wang | H04N 19/119 |

OTHER PUBLICATIONS

"Information Technology—Coding of Audio-Visual Objects—Part 12: ISO Base Media File Format", ISO/IEC 14496-12, Fifth edition, Dec. 15, 2015, 248 pages.

"Video coding for low bit rate communication", Series H: Audiovisual and Multimedia Systems Infrastructure of audiovisual services—Coding of moving video, ITU-T Recommendation H.263, Jan. 2005, 226 pages.

"Advanced Video Coding for Generic Audiovisual Services", Series H: Audiovisual and Multimedia Systems, Infrastructure of audiovisual services—Coding of moving video, ITU-T Recommendation H.264, Aug. 2021, 844 pages.

"High efficiency video coding", Series H: Audiovisual and Multimedia Systems Infrastructure of audiovisual services—Coding of moving video, ITU-T Recommendation H.265, Aug. 2021, 716 pages.

"3rd Generation Partnership Project; Technical Specification Group Services and System Aspects; Transparent end-to-end Packet-switched Streaming Service (PSS); Protocols and codecs (Release 17)", 3GPP TS 26.234, V17.0.0, Apr. 2022, pp. 1-173.

"Information technology—Dynamic adaptive streaming over HTTP (DASH)—Part 1: Media presentation description and segment formats", ISO/IEC 23009-1, Jun. 24, 2021, 336 pages.

"3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 17)", 3GPP TS 26.247, V17.0.0, Mar. 2022, pp. 1-140.

Pantos et al., "HTTP Live Streaming", RFC 8216, Independent Submission, Aug. 2017, pp. 1-60.

"Technologies under Consideration for ISOBMFile Format", ISO/IEC JTC 1/SC 29/WG 03, N0440, MPEG Systems, Feb. 2022, 61 pages.

Wang, "[6.2][ISOBMFF] Picture-in-picture support in file format", ISO/IEC JTC 1/SC 29/WG 3 m57985, Oct. 2021, 4 pages.

Wang, "[6.2][ISOBMFF] On picture-in-picture signalling in ISOBMFF", ISO/IEC JTC 1/SC 29/WG 3 m58905, Jan. 2022, 5 pages.

Wang, "[30.3][DASH] Support of picture-in-picture services in DASH", ISO/IEC JTC 1/SC 29/WG 3 m57431, Jul. 2021, 339 pages.

Wang, "[31.2][DASH] Picture-in-picture support in DASH", ISO/IEC JTC 1/SC 29/WG 3 m57983, Oct. 2021, 341 pages.

Sodagar, "[DASH][TuC] On picture-in-picture use case", ISO/IEC JTC 1/SC 29/WG 3 m58177, Oct. 2021, pp. 1-2.

Sodagar, "[DASH][TuC] Rethinking picture-in-picture", ISO/IEC JTC 1/SC 29/WG 3 m58924, Jan. 2022, pp. 1-3.

"Information technology—Generic coding of moving pictures and associated audio information: Systems", Series H: Audiovisual and Multimedia Systems, Infrastructure of audiovisual services—Transmission multiplexing and synchronization, Recommendation ITU-T H.222.0, Jun. 2021, 340 pages.

"Information technology—Generic coding of moving pictures and associated audio information: Video: Frame packing arrangement signalling for 3D content, Amendment 4", Series H: Audiovisual and Multimedia Systems Infrastructure of audiovisual services—Coding of moving video, Recommendation ITU-T H.262, Feb. 2012, 238 pages.

"Information technology—Universal coded character set (UCS)", ISO/IEC 10646, Sixth edition, Dec. 2020, 15 pages.

"IEEE 802.11", Wikipedia, Retrieved on Nov. 11, 2024, Webpage available at : https://en.wikipedia.org/wiki/IEEE_802.11.

International Search Report and Written Opinion received for corresponding Patent Cooperation Treaty Application No. PCT/IB2023/053557, dated Aug. 17, 2023, 13 pages.

"Guidelines for personalization and accessibility with VVC", Digital Video Broadcasting, TM-AVC1221r1, Jun. 10, 2021, 3 pages.

"Information technology—Coding of audio-visual objects—Part 15: Carriage of network abstraction layer (NAL) unit structured video in the ISO base media file format—Amendment 2: Carriage of VVC and EVC in ISOBMFF", ISO/IEC 14496-15, Amendment 2, 2019, 58 pages.

* cited by examiner

1200

1400

METHOD AND APPARATUS FOR ENCODING, DECODING, OR DISPLAYING PICTURE-IN-PICTURE

RELATED APPLICATION

This application claims priority to PCT Patent Application No. PCT/IB2023/053557, filed Apr. 6, 2023, which claims priority from U.S. Provisional Application No. 63/363,271, filed on Apr. 20, 2022, which is incorporated herein by reference in its entirety.

TECHNICAL FIELD

The examples and non-limiting embodiments relate generally to multimedia coding and transporting, and more particularly, for encoding, decoding, and/or displaying a picture-in-picture.

BACKGROUND

It is known to encode, decode, or display media data.

SUMMARY

An example apparatus includes: at least one processor; and at least one non-transitory memory including computer program code; wherein the at least one memory and the computer program code are configured to, with the at least one processor, cause the apparatus at least to perform: receive or generate a first encoded bitstream comprising at least one independently encoded subpicture; receive or generate a second encoded bitstream comprising one or more independently encoded subpictures; generate an encapsulated file with a first track and a second track, wherein the first track comprises the first encoded bitstream comprising the at least one independently encoded subpicture, and wherein the second track comprises the second encoded bitstream comprising the one or more independently encoded subpictures; and wherein to generate the encapsulated file the apparatus is further caused to include following information in the encapsulated file: a picture-in-picture relationship between the first track and the second track; and data units of the at least one independently coded subpicture in the first encoded bitstream of the first track that are to be replaced by data units of the one or more independently coded subpictures of the second encoded bitstream of the second track.

The example apparatus may further include, wherein resolution of one or more subpictures in the second encoded bitstream is same or substantially same as resolution of corresponding one or more subpictures in the first encoded bitstream.

The example apparatus may further include, wherein the apparatus is further caused to include data units indicated by a byte range or according to units specified by an encoding standard used to encode the first encoded bitstream and the second encoded bitstream.

The example apparatus may further include, wherein the apparatus is further caused to use the one or more subpictures in the second encoded bitstream to replace the corresponding one or more subpictures in the first encoded bitstream to generate a picture-in-picture.

The example apparatus may further include, wherein to generate the encapsulated file, the apparatus is further caused to: write in a container file; generate a map entry to assign a unique group ID to data units for the first encoded bitstreams comprised in the first track; and generate an extract and merge sample group, wherein the extract and merge sample group comprises the unique group ID of data units which are to be replaced by corresponding data units of the second encoded bitstream of the second track.

The example apparatus may further include, wherein the data units identified by the group ID in the extract and merge sample group form a rectangular region.

The example apparatus may further include, wherein the extract and merge sample group comprise information about a position and area occupied by the data units identified by the unique group ID in the first track.

The example apparatus may further include, wherein the extract and merge sample group further comprise: an indication of whether selected subpicture IDs are to be changed in picture parameter set or sequence parameter set units; a length of subpicture ID syntax elements; a bit position of the subpicture ID syntax elements in a containing raw byte sequence payload; a flag indicating whether start code emulation prevention bytes are present before or within subpicture IDs; a parameter set ID of a parameter set comprising the subpicture IDs; a bit position of a pps_mixed_nalu_types_in_pic_flag syntax element in the containing raw byte sequence payload; or a parameter set ID of a parameter set comprising the pps_mixed_nalu_types_in_pic_flag syntax element.

The example apparatus may further include, wherein the extract and merge sample group further comprise at least one of following: a group ID is a unique identifier for the extract and merge group described by this sample group entry; a region flag specifies that the region covered by the data units within the at least one subpicture picture or the one or more subpictures and associated with the extract and merge group entry is a rectangular region or not; a full picture field, when set, indicates that each rectangular region associated with the extract and merge group entry comprises a complete picture; a filtering disabled field, when set, indicates that for each rectangular region associated with the extract and merge group entry an in-loop filtering operation does not require access to pixels in an adjacent rectangular region; a horizontal offset field and a vertical offset field comprise horizontal and vertical offsets respectively of a top-left pixel of a rectangular region that associated with the extract and merge group entry, relative to a top-left pixel of a base region in luma samples; a region width field and a region height field comprise a width and a height of the rectangular region that is covered by the data units in the each rectangular region associated with the extract and merge group entry in luma samples; a subpicture length field comprises a number of bits in subpicture identifier syntax element; a subpicture position filed specifies a bit position starting from 0 of a first bit of a first subpicture ID syntax element; a start code emulation flag specifies whether start code emulation prevention bytes are present or not present before or within subpicture IDs in a referenced data unit; a sequence parameter set (SPS) or picture parameter set (PPS) ID flag, when equal to 1, specifies that PPS units applying to samples mapped to the sample group description entry comprises subpicture ID syntax elements, and when PPS or SPS ID flag is equal to 0, specifies that the SPS units applying to the samples mapped to the sample group description entry comprise subpicture ID syntax elements; a PPS id, when present, specifies the PPS ID of the PPS applying to the samples mapped to the sample group description entry; a SPS id, when present, specifies the SPS ID of the SPS applying to the samples mapped to the sample group description entry; or a pps_mix_nalu_types_in_pic_bit_pos specifies the bit position starting from 0 of the pps_mixed_nalu_types_in_pic_flag syntax element in the referenced PPS RBSP.

The example apparatus may further include, wherein the base region used in a subpicture extract and merge entry is a picture to which the data units in the rectangular region associated with the extract and merge group entry belongs.

The example apparatus may further include, wherein the second track comprises a track reference box comprising a reference type to indicate that the second track comprises the picture-in-picture video and a main video is comprises in a referenced track or any track in an alternate group to which the referenced track belongs.

The example apparatus may further include, wherein when a subset of subpictures in the second encoded bitstream comprised in the second track participate in the picture-in-picture feature, the second track further comprises at least one of following: a map entry which is used to assign a unique identifier, by using the group ID, to each data unit within the second track; or an extract and merge sample group, wherein the extract and merge sample group comprise the group ID of the data units that are used to replace the corresponding data units of the first encoded bitstream comprised in the first track.

The example apparatus may further include, wherein the apparatus is further caused to define a track group to group the first track and the second track.

The example apparatus may further include, wherein the track group comprises information for indicating whether a track comprises the first track or the second track.

The example apparatus may further include, wherein the track group comprises a track group ID for indicating whether a map group ID from the map entry correspond to a foreground region or a background region.

Another example apparatus includes: at least one processor; and at least one non-transitory memory including computer program code; wherein the at least one memory and the computer program code are configured to, with the at least one processor, cause the apparatus at least to perform: receive an encapsulated file comprising a first track and a second track, wherein the first track comprises a first encoded bitstream comprising at least one independently encoded subpictures, and wherein the second track comprises a second encoded bitstream comprising one or more independently coded subpictures; parse following information from the encapsulated file: a picture-in-picture relationship between the first track and the second track; and data units of the at least one independently coded subpictures in the first encoded bitstream comprised in the first track that are to be replaced by data units of the one or more independently coded subpictures of the second encoded bitstream of the second track; reconstruct a third bitstream by replacing data units of one more independently encoded pictures of the at least one independently encoded subpictures comprised in the first encoded bitstream of the first track by the data units of the one or more independently encoded subpictures of the second encoded bitstream comprised in the second track by using the parsed information; and decode or play the third bitstream.

The example apparatus may further include, wherein the apparatus is further caused to include data units indicated by a byte range or according to units specified by an encoding standard used to encode the first encoded bitstream and the second encoded bitstream.

The example apparatus may further include, wherein the one or more independently encoded subpictures of the at least one independently encoded subpicture comprised in the first bitstream correspond to the one or more independently encoded subpictures comprised in the second bitstream.

The example apparatus may further include, wherein a resolution of the one or more independently encoded subpictures of the at least one independently encoded subpicture comprised in the first bitstream is same or substantially same as a resolution of the one or more independently encoded subpictures comprised in the second bitstream.

Yet another example apparatus includes: at least one processor; and at least one non-transitory memory including computer program code; wherein the at least one memory and the computer program code are configured to, with the at least one processor, cause the apparatus at least to perform: write into a file: a first media content or a subset thereof of a first set of media components for a main video track; a second of media components of a second set of media components for a picture-in-picture video track; and include the following information in the file: a picture-in-picture relationship between the first media content or a subset thereof of the first set of media components and the second media content or a subset thereof of the second set of media components; and a region id type value to indicates a type for a value taken by a region id.

The example apparatus may further include, wherein: the file comprises a manifest file; the first set of media components comprise a first adaptation set; the first media content comprises a first representation of the first adaptation set; the second set of media components comprise a second adaptation set; or the second media content comprises a second representation of the second adaptation set.

The example apparatus may further include, wherein when region id type is equal to 1, region IDs comprise group ID value in an abstraction layer unit map sample group for the abstraction layer units that may be replaced by the abstraction layer units of the picture in picture representation, and wherein when region id type is equal to 0, the region IDs comprise subpicture IDs.

The example apparatus may further include, wherein the apparatus is further caused to include following in the file: a region id type value indicated at least at the adaptation set level or at the representation level; or a region id value to specify the i-th ID for encoded video data units representing a target picture-in-picture region in the representation comprising the main video.

An example method includes: receiving or generating a first encoded bitstream comprising at least one independently encoded subpicture; receiving or generating a second encoded bitstream comprising one or more independently encoded subpictures; generating an encapsulated file with a first track and a second track, wherein the first track comprises the first encoded bitstream comprising the at least one independently encoded subpicture, and wherein the second track comprises the second encoded bitstream comprising the one or more independently encoded subpictures; and wherein for generating the encapsulated file the method further comprises including following information in the encapsulated file: a picture-in-picture relationship between the first track and the second track; and data units of the at least one independently coded subpicture in the first encoded bitstream of the first track that are to be replaced by data units of the one or more independently encoded subpictures of the second encoded bitstream of the second track.

The example method may further include, wherein resolution of one or more subpictures in the second encoded bitstream is same or substantially same as resolution of corresponding one or more subpictures in the first encoded bitstream.

The example method may further include including data units indicated by a byte range or according to units specified by an encoding standard used to encode the first encoded bitstream and the second encoded bitstream.

The example method may further include using the one or more subpictures in the second encoded bitstream to replace the corresponding one or more subpictures in the first encoded bitstream to generate a picture-in-picture.

The example method may further include, wherein generating the encapsulated file comprises: writing in a container file; generating a map entry to assign a unique group ID to data units for the first encoded bitstreams comprised in the first track; and generating an extract and merge sample group, wherein the extract and merge sample group comprises the unique group ID of data units which are to be replaced by corresponding data units of the second encoded bitstream of the second track.

The example method may further include, wherein the data units identified by the group ID in the extract and merge sample group form a rectangular region.

The example method may further include, wherein the extract and merge sample group comprise information about a position and area occupied by the data units identified by the unique group ID in the first track.

The example method may further include, wherein the extract and merge sample group further comprises: an indication of whether selected subpicture IDs are to be changed in picture parameter set or sequence parameter set units; a length of subpicture ID syntax elements; a bit position of the subpicture ID syntax elements in a containing raw byte sequence payload; a flag indicating whether start code emulation prevention bytes are present before or within subpicture IDs; a parameter set ID of a parameter set comprising the subpicture IDs; a bit position of a pps_mixed_nalu_types_in_pic_flag syntax element in the containing raw byte sequence payload; or a parameter set ID of a parameter set comprising the pps_mixed_nalu_types_in_pic_flag syntax element.

The example method may further include, wherein the extract and merge sample group further comprises at least one of following: a group ID is a unique identifier for the extract and merge group described by this sample group entry; a region flag specifies that the region covered by the data units within the at least one subpicture picture or the one or more subpictures and associated with the extract and merge group entry is a rectangular region or not; a full picture field, when set, indicates that each rectangular region associated with the extract and merge group entry comprises a complete picture; a filtering disabled field, when set, indicates that for each rectangular region associated with the extract and merge group entry an in-loop filtering operation does not require access to pixels in an adjacent rectangular region; a horizontal offset field and a vertical offset field comprise horizontal and vertical offsets respectively of a top-left pixel of a rectangular region that associated with the extract and merge group entry, relative to a top-left pixel of a base region in luma samples; a region width field and a region height field comprise a width and a height of the rectangular region that is covered by the data units in the each rectangular region associated with the extract and merge group entry in luma samples; a subpicture length field comprises a number of bits in subpicture identifier syntax element; a subpicture position filed specifies a bit position starting from 0 of a first bit of a first subpicture ID syntax element; a start code emulation flag specifies whether start code emulation prevention bytes are present or not present before or within subpicture IDs in a referenced data unit; a sequence parameter set (SPS) or picture parameter set (PPS) ID flag, when equal to 1, specifies that PPS units applying to samples mapped to the sample group description entry comprises subpicture ID syntax elements, and when PPS or SPS ID flag is equal to 0, specifies that the SPS units applying to the samples mapped to the sample group description entry comprise subpicture ID syntax elements; a PPS id, when present, specifies the PPS ID of the PPS applying to the samples mapped to the sample group description entry; a SPS id, when present, specifies the SPS ID of the SPS applying to the samples mapped to the sample group description entry; or a pps_mix_nalu_types_in_pic_bit_pos specifies the bit position starting from 0 of the pps_mixed_nalu_types_in_pic_flag syntax element in the referenced PPS RBSP.

The example method may further include, wherein the base region used in a subpicture extract and merge entry is a picture to which the data units in the rectangular region associated with the extract and merge group entry belongs.

The example method may further include, wherein the second track comprises a track reference box comprising a reference type to indicate that the second track comprises the picture-in-picture video and a main video is comprises in a referenced track or any track in an alternate group to which the referenced track belongs.

The example method may further include, wherein when a subset of subpictures in the second encoded bitstream comprised in the second track participate in the picture-in-picture feature, the second track further comprises at least one of following: a map entry which is used to assign a unique identifier, by using the group ID, to each data unit within the second track; or an extract and merge sample group, wherein the extract and merge sample group comprises the group ID of the data units that are used to replace the corresponding data units of the first encoded bitstream comprised in the first track.

The example method may further include, wherein the apparatus is further caused to define a track group to group the first track and the second track.

The example method may further include, wherein the track group comprises information for indicating whether a track comprises the first track or the second track.

The example method may further include, wherein the track group comprises a track group ID for indicating whether a map group ID from the map entry correspond to a foreground region or a background region.

Another example method includes: receiving an encapsulated file comprising a first track and a second track, wherein the first track comprises a first encoded bitstream comprising at least one independently encoded subpictures, and wherein the second track comprises a second encoded bitstream comprising one or more independently coded subpictures; parsing following information from the encapsulated file: a picture-in-picture relationship between the first track and the second track; and data units of the at least one independently coded subpictures in the first encoded bitstream comprised in the first track that are to be replaced by data units of the one or more independently coded subpictures of the second encoded bitstream of the second track; reconstructing a third bitstream by replacing data units of one more independently encoded pictures of the at least one independently encoded subpictures comprised in the first encoded bitstream of the first track by the data units of the one or more independently encoded subpictures of the second encoded bitstream comprised in the second track by using the parsed information; and decoding or play the third bitstream.

The example method may further include including data units indicated by a byte range or according to units specified by an encoding standard used to encode the first encoded bitstream and the second encoded bitstream.

The example method may further include, wherein the one or more independently encoded subpictures of the at least one independently encoded subpicture comprised in the first bitstream correspond to the one or more independently encoded subpictures comprised in the second bitstream.

The example method may further include, wherein a resolution of the one or more independently encoded subpictures of the at least one independently encoded subpicture comprised in the first bitstream is same or substantially same as a resolution of the one or more independently encoded subpictures comprised in the second bitstream.

Yet another example method includes: writing the following into a file: a first media content or a subset thereof of a first set of media components for a main video track; a second of media components of a second set of media components for a picture-in-picture video track; including the following information in the file: a picture-in-picture relationship between the first media content or a subset thereof of the first set of media components and the second media content or a subset thereof of the second set of media components; and a region id type value to indicates a type for a value taken by a region id.

The example method may further includes, wherein the file comprises a manifest file; the first set of media components comprise a first adaptation set; the first media content comprises a first representation of the first adaptation set; the second set of media components comprise a second adaptation set; or the second media content comprises a second representation of the second adaptation set.

The example method may further include, wherein when region id type is equal to 1, region IDs comprise group ID value in an abstraction layer unit map sample group for the abstraction layer units that may be replaced by the abstraction layer units of the picture in picture representation, and wherein when region id type is equal to 0, the region IDs comprise subpicture IDs.

The example method may further include including following in the file: a region id type value indicated at least at the adaptation set level or at the representation level; or a region id value to specify the i-th ID for encoded video data units representing a target picture-in-picture region in the representation comprising the main video.

An example computer readable medium comprising program instructions for causing an apparatus to perform at least the following: receive or generate a first encoded bitstream comprising at least one independently encoded subpicture; receive or generate a second encoded bitstream comprising one or more independently encoded subpictures; generate an encapsulated file with a first track and a second track, wherein the first track comprises the first encoded bitstream comprising the at least one independently encoded subpicture, and wherein the second track comprises the second encoded bitstream comprising the one or more independently encoded subpictures; and wherein to generate the encapsulated file the apparatus is further caused to include following information in the encapsulated file: a picture-in-picture relationship between the first track and the second track; and data units of the at least one independently coded subpicture in the first encoded bitstream of the first track that are to be replaced by data units of the one or more independently coded subpictures of the second encoded bitstream of the second track.

The example computer readable medium may further include, wherein resolution of one or more subpictures in the second encoded bitstream is same or substantially same as resolution of corresponding one or more subpictures in the first encoded bitstream;

The example computer readable medium may further include, wherein the computer readable medium comprises a non-transitory computer readable medium.

The example computer readable medium may further include, wherein the computer readable medium further causes the apparatus to perform the methods as described in one or more of the previous paragraphs.

Another example computer readable medium comprising program instructions for causing an apparatus to perform at least the following: receive an encapsulated file comprising a first track and a second track, wherein the first track comprises a first encoded bitstream comprising at least one independently encoded subpictures, and wherein the second track comprises a second encoded bitstream comprising one or more independently coded subpictures; parse following information from the encapsulated file: a picture-in-picture relationship between the first track and the second track; and data units of the at least one independently coded subpictures in the first encoded bitstream comprised in the first track that are to be replaced by data units of the one or more independently coded subpictures of the second encoded bitstream of the second track; reconstruct a third bitstream by replacing data units of one more independently encoded pictures of the at least one independently encoded subpictures comprised in the first encoded bitstream of the first track by the data units of the one or more independently encoded subpictures of the second encoded bitstream comprised in the second track by using the parsed information; and decode or play the third bitstream.

The example computer readable medium may further include, wherein the computer readable medium comprises a non-transitory computer readable medium.

The example computer readable medium may further include, wherein the computer readable medium further causes the apparatus to perform the methods as described in one or more of the previous paragraphs.

Yet another example computer readable medium comprising program instructions for causing an apparatus to perform at least the following: write following into a file: a first representation of a first adaptation set for a main video track; a second representation of a second adaptation set for a picture-in-picture video track; include the following information in the file: a picture-in-picture relationship between the first representation of the first adaptation set and the second representation of the second adaptation set at least one of an adaptation set level or at a representation level; and a region id type value to indicates a type for a value taken by a region id.

The example computer readable medium may further include, wherein the computer readable medium comprises a non-transitory computer readable medium.

The example computer readable medium may further include, wherein the computer readable medium further causes the apparatus to perform the methods as described in one or more of the previous paragraphs.

Still another example apparatus includes means for performing the methods as described in one or more of the previous paragraphs.

BRIEF DESCRIPTION OF THE DRAWINGS

The foregoing aspects and other features are explained in the following description, taken in connection with the accompanying drawings, wherein.

DETAILED DESCRIPTION OF EXAMPLE EMBODIMENTS

Figure 1:
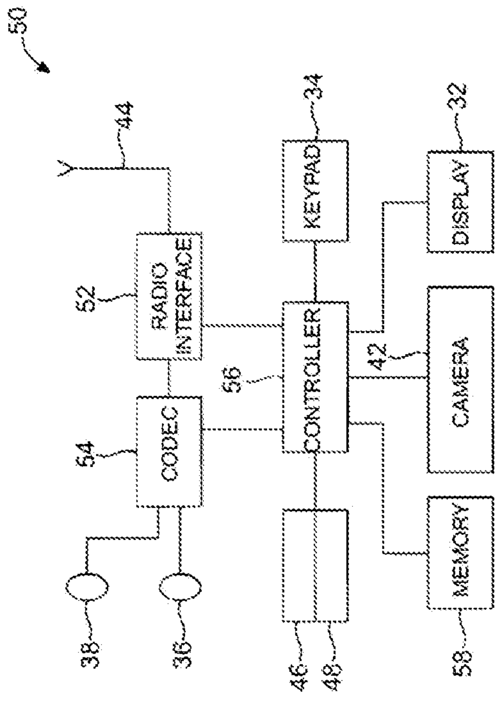
FIG. 1 shows schematically an electronic device employing embodiments of the examples described herein.

The following acronyms and abbreviations that may be found in the specification and/or the drawing figures are defined as follows:

3GP 3GPP file format
3GPP 3rd Generation Partnership Project
3GPP TS 3GPP technical specification
4CC four character code
4G fourth generation of broadband cellular network technology
5G fifth generation cellular network technology
5GC 5G core network
ACC accuracy
AI artificial intelligence
AIoT AI-enabled IoT
a.k.a. also known as
AMF access and mobility management function
AVC advanced video coding
CABAC context-adaptive binary arithmetic coding
CDMA code-division multiple access
content delivery network CDN
CE core experiment
CU central unit
DASH dynamic adaptive streaming over HTTP
DCT discrete cosine transform
DSP digital signal processor
DU distributed unit
EBML extensible binary meta language
EDRAP extended dependent random access point
eNB (or eNodeB) evolved Node B (for example, an LTE base station)
EN-DC E-UTRA-NR dual connectivity
en-gNB or En-gNB node providing NR user plane and control plane protocol terminations towards the UE, and acting as secondary node in EN-DC
EST external stream track
E-UTRA evolved universal terrestrial radio access, for example, the LTE radio access technology
FDMA frequency division multiple access
f(n) fixed-pattern bit string using n bits written (from left to right) with the left bit first.
F1 or F1-C interface between CU and DU control interface
gNB (or gNodeB) base station for 5G/NR, for example, a node providing NR user plane and control plane protocol terminations towards the UE, and connected via the NG interface to the 5GC
GOP group of picture
GSM Global System for Mobile communications
H.222.0 MPEG-2 Systems is formally known as ISO/IEC 13818-1 and as ITU-T Rec. H.222.0
H.26x family of video coding standards in the domain of the ITU-T
HLS high level syntax
HRD hypothetical reference decoder
HTTP hypertext transfer protocol
IBC intra block copy
ID identifier
IEC International Electrotechnical Commission
IEEE Institute of Electrical and Electronics Engineers
I/F interface
IMD integrated messaging device
IMS instant messaging service
IoT internet of things
IP internet protocol
ISO International Organization for Standardization
ISOBMFF ISO base media file format
ITU International Telecommunication Union
ITU-T ITU Telecommunication Standardization Sector
JPEG joint photographic experts group
JVT joint video team
LTE long-term evolution
LZMA Lempel-Ziv-Markov chain compression
LZMA2 simple container format that can include both uncompressed data and LZMA data
LZO Lempel-Ziv-Oberhumer compression
LZW Lempel-Ziv-Welch compression
MAC medium access control
mdat MediaDataBox
MME mobility management entity
MMS multimedia messaging service
moov MovieBox
MP4 file format for MPEG-4 Part 14 files
MPEG moving picture experts group
MPEG-2 H.222/H.262 as defined by the ITU
MPEG-4 audio and video coding standard for ISO/IEC 14496
MSB most significant bit
MVC multiview video coding
NAL network abstraction layer
NDU NN compressed data unit
ng or NG new generation
ng-eNB or NG-eNB new generation eNB NN neural network
NNEF neural network exchange format
NNR neural network representation
NR new radio (5G radio)
N/W or NW network
ONNX Open Neural Network eXchange
PB protocol buffers
PC personal computer
PDA personal digital assistant
PDCP packet data convergence protocol
PHY physical layer
PID packet identifier
PLC power line communication
PNG portable network graphics
PSNR peak signal-to-noise ratio
RAM random access memory
RAP random access point
RAN radio access network
RFC request for comments
RFID radio frequency identification
RLC radio link control
RRC radio resource control
RRH remote radio head
RU radio unit
Rx receiver
SAP stream access point
SDAP service data adaptation protocol
SGW serving gateway
SMF session management function
SMS short messaging service
st(v) null-terminated string encoded as UTF-8 characters as specified in ISO/IEC 10646
SVC scalable video coding
S1 interface between eNodeBs and the EPC
TCP-IP transmission control protocol-internet protocol
TDMA time divisional multiple access
trak TrackBox
TS transport stream
TUC technology under consideration
TV television
Tx transmitter
UE user equipment
ue(v) unsigned integer Exp-Golomb-coded syntax element with the left bit first
UICC Universal Integrated Circuit Card
UMTS Universal Mobile Telecommunications System
u(n) unsigned integer using n bits
UPF user plane function
URI uniform resource identifier
URL uniform resource locator
UTF-8 8-bit Unicode Transformation Format
VCEG video coding experts group
VCL video coding layer
WLAN wireless local area network
X2 interconnecting interface between two eNodeBs in LTE network
Xn interface between two NG-RAN nodes Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms 'data', 'content', 'information', and similar terms may be used interchangeably to refer to data capable of being transmitted, received and/or stored in accordance with embodiments. Thus, use of any such terms should not be taken to limit the spirit and scope of embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even when the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a 'computer-readable storage medium', which refers to a non-transitory physical storage medium (e.g., volatile or non-volatile memory device), can be differentiated from a 'computer-readable transmission medium', which refers to an electromagnetic signal.

A method, apparatus and computer program product are provided in accordance with an example embodiment in order to implement mechanisms caused to implement mechanisms for displaying picture-in-picture.

Figure 2:
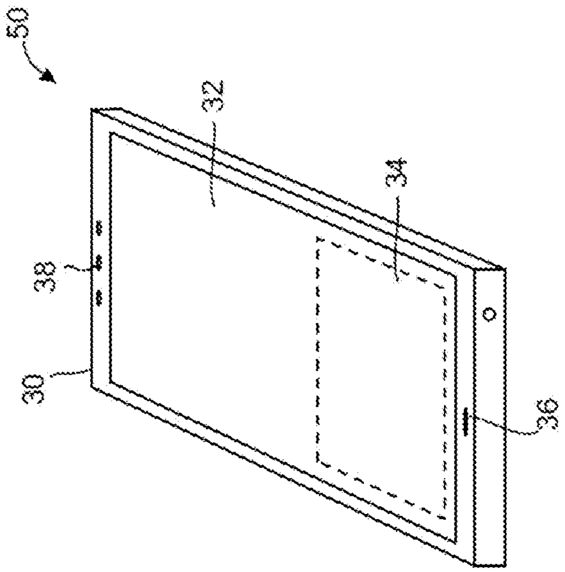
FIG. 2 shows schematically a user equipment suitable for employing embodiments of the examples described herein.

The following describes in detail suitable apparatus and possible mechanisms for encoding, decoding, and/or displaying a picture-in-picture according to various embodiments. In this regard reference is first made to FIG. 1 and FIG. 2, where FIG. 1 shows an example block diagram of an apparatus 50. The apparatus may be an internet of things (IoT) apparatus configured to perform various functions, for example, gathering information by one or more sensors, receiving or transmitting information, analyzing information gathered or received by the apparatus, or the like. The apparatus may comprise a video coding system, which may incorporate a codec. FIG. 2 shows a layout of an apparatus according to an example embodiment. The elements of FIG. 1 and FIG. 2 will be explained next.

The electronic device 50 may for example be a mobile terminal or user equipment of a wireless communication system, a sensor device, a tag, or a lower power device. However, it would be appreciated that embodiments of the examples described herein may be implemented within any electronic device or apparatus.

The apparatus 50 may comprise a housing 30 for incorporating and protecting the device. The apparatus 50 may further comprise a display 32, for example, in the form of a liquid crystal display, light emitting diode display, organic light emitting diode display, and the like. In other embodiments of the examples described herein the display may be any suitable display technology suitable to display media or multimedia content, for example, an image or a video. The apparatus 50 may further comprise a keypad 34. In other embodiments of the examples described herein any suitable data or user interface mechanism may be employed. For example, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the examples described herein may be any one of: an earpiece 38, speaker, or an analogue audio or digital audio output connection. The apparatus 50 may also comprise a battery (or in other embodiments of the examples described herein the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, a processor or a processor circuitry for controlling the apparatus 50. The controller 56 may be connected to a memory 58 which in embodiments of the examples described herein may store both data in the form of an image, audio data, video data, and/or may also store instructions for implementation on the controller 56. The controller 56 may further be connected to codec circuitry 54 suitable for carrying out coding and/or decoding of audio, image, and/or video data or assisting in coding and/or decoding carried out by the controller.

The apparatus 50 may further comprise a card reader 48 and a smart card 46, for example, a UICC and UICC reader for providing user information and being suitable for providing authentication information for authentication and authorization of the user at a network.

The apparatus 50 may comprise radio interface circuitry 52 connected to the controller and suitable for generating wireless communication signals, for example, for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The apparatus 50 may comprise a camera 42 capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
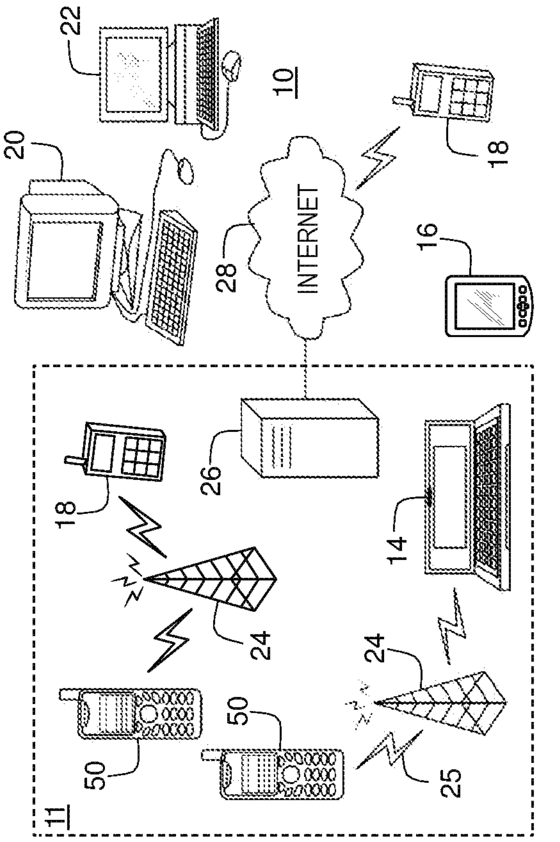
FIG. 3 further shows schematically electronic devices employing embodiments of the examples described herein connected using wireless and wired network connections.

With respect to FIG. 3, an example of a system within which embodiments of the examples described herein can be utilized is shown. The system 10 comprises multiple communication devices which can communicate through one or more networks. The system 10 may comprise any combination of wired or wireless networks including, but not limited to, a wireless cellular telephone network (such as a GSM, UMTS, CDMA, LTE, 4G, 5G network, and the like), a wireless local area network (WLAN) such as defined by any of the IEEE 802.x standards, a Bluetooth® personal area network, an Ethernet local area network, a token ring local area network, a wide area network, and the Internet.

The system 10 may include both wired and wireless communication devices and/or apparatus 50 suitable for implementing embodiments of the examples described herein.

For example, the system shown in FIG. 3 shows a mobile telephone network 11 and a representation of the Internet 28. Connectivity to the Internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; for example, a digital TV receiver, which may/may not have a display or wireless capabilities, in tablets or (laptop) personal computers (PC), which have hardware and/or software to process neural network data, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, 3GPP Narrowband IoT and any similar wireless communication technology. A communications device involved in implementing various embodiments of the examples described herein may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

The embodiments may also be implemented in internet of things (IoT) devices. The IoT may be defined, for example, as an interconnection of uniquely identifiable embedded computing devices within the existing Internet infrastructure. The convergence of various technologies has and may enable many fields of embedded systems, such as wireless sensor networks, control systems, home/building automation, and the like, to be included the IoT. In order to utilize the Internet, IoT devices are provided with an IP address as a unique identifier. The IoT devices may be provided with a radio transmitter, such as WLAN or Bluetooth® transmitter or an RFID tag. Alternatively, IoT devices may have access to an IP-based network via a wired network, such as an Ethernet-based network or a power-line connection (PLC).

The devices/systems described in FIGS. 1 to 3 encoding, decoding, signalling, and/or transporting of an image file format, in accordance with various embodiments.

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Video codec includes an encoder that transforms the input video into a compressed representation suited for storage/transmission and a decoder that can decompress the compressed video representation back into a viewable form. A video encoder and/or a video decoder may also be separate from each other, for example, need not form a codec. Typically, encoder discards some information in the original video sequence in order to represent the video in a more compact form (e.g., at lower bitrate).

Typical hybrid video encoders, for example, many encoder implementations of ITU-T H.263 and H.264, encode the video information in two phases. Firstly pixel values in a certain picture area (or "block") are predicted, for example, by motion compensation means (finding and indicating an area in one of the previously coded video frames that corresponds closely to the block being coded) or by spatial means (using the pixel values around the block to be coded in a specified manner). Secondly the prediction error, for example, the difference between the predicted block of pixels and the original block of pixels, is coded. This is typically done by transforming the difference in pixel values using a specified transform (for example, Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction and current picture referencing), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, for example, either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently when they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
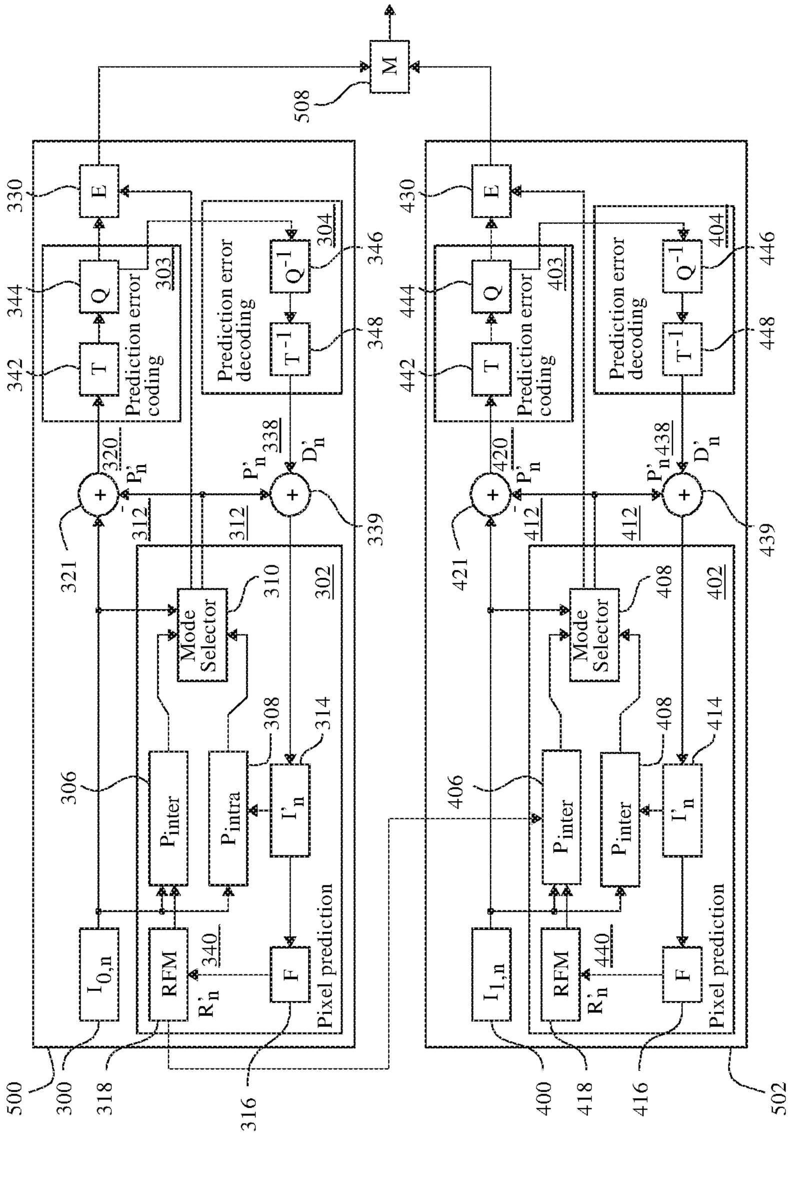
FIG. 4 shows schematically a block diagram of an encoder on a general level.

FIG. 4 shows a block diagram of a general structure of a video encoder. FIG. 4 presents an encoder for two layers, but it would be appreciated that presented encoder could be similarly extended to encode more than two layers. FIG. 4 illustrates a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives base layer image(s) 300 of a video stream to be encoded at both the inter-predictor 306 (which determines the difference between the image and a motion compensated reference frame) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer image 300. Correspondingly, the pixel predictor 402 of the second encoder section 502 receives enhancement layer image(s) 400 of a video stream to be encoded at both the inter-predictor 406 (which determines the difference between the image and a motion compensated reference frame) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer image(s) 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector 310, 410 is passed to a first summing device 321, 421. The first summing device may subtract the output of the pixel predictor 302, 402 from the base layer image 300 or the enhancement layer image 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer image 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer images 400 is compared in inter-prediction operations. Moreover, the reference frame memory 418 may be connected to the inter-predictor 406 to be used as the reference image against which a future enhancement layer image 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, for example, the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 346, 446, which dequantizes the quantized coefficient values, for example, DCT coefficients, to reconstruct the transform signal and an inverse transformation unit 348, 448, which performs the inverse transformation to the reconstructed transform signal wherein the output of the inverse transformation unit 348, 448 includes reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream, for example, by a multiplexer 508.

Figure 5:
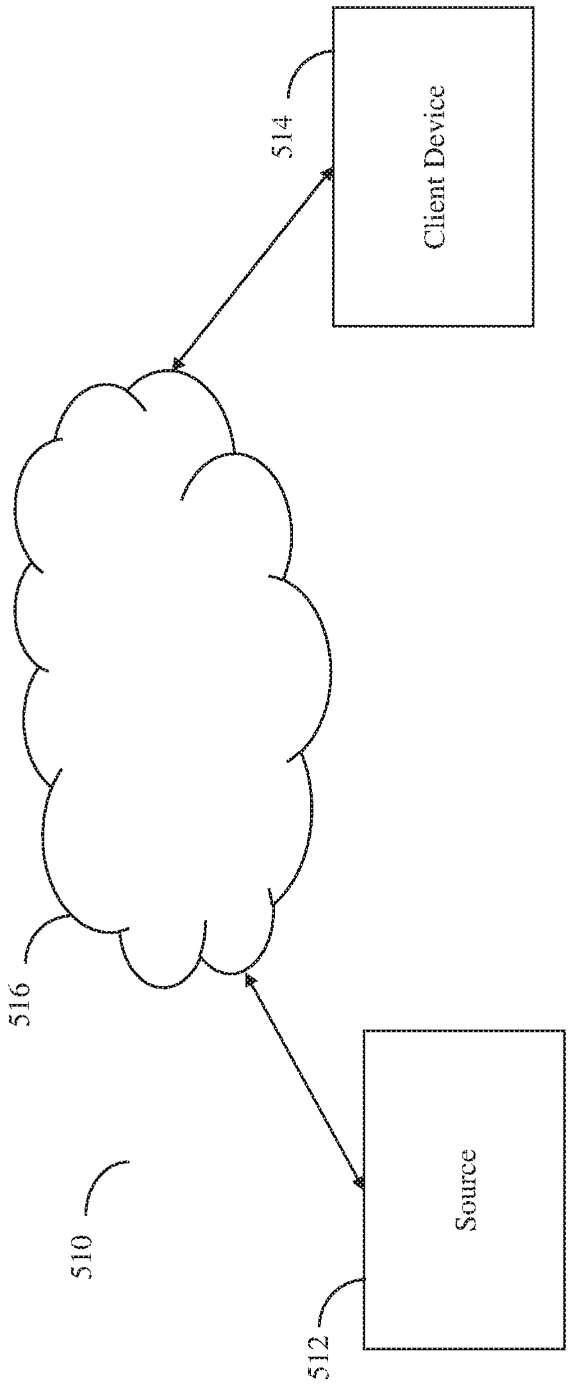
FIG. 5 illustrates a system configured to support streaming of media data from a source to a client device.

The method and apparatus of an example embodiment may be utilized in a wide variety of systems, including systems that rely upon the compression and decompression of media data and possibly also the associated metadata. In one embodiment, however, the method and apparatus are configured to compress the media data and associated metadata streamed from a source via a content delivery network to a client device, at which point the compressed media data and associated metadata is decompressed or otherwise processed. In this regard, FIG. 5 depicts an example of such a system 510 that includes a source 512 of media data and associated metadata. The source may be, in one embodiment, a server. However, the source may be embodied in other manners when desired. The source is configured to stream the media data and associated metadata to the client device 514. The client device may be embodied by a media player, a multimedia system, a video system, a smart phone, a mobile telephone or other user equipment, a personal computer, a tablet computer or any other computing device configured to receive and decompress the media data and process associated metadata. In the illustrated embodiment, media data and metadata are streamed via a network 516, such as any of a wide variety of types of wireless networks and/or wireline networks. The client device is configured to receive structured information including media, metadata and any other relevant representation of information including the media and the metadata and to decompress the media data and process the associated metadata (e.g. for proper playback timing of decompressed media data).

Figure 6:
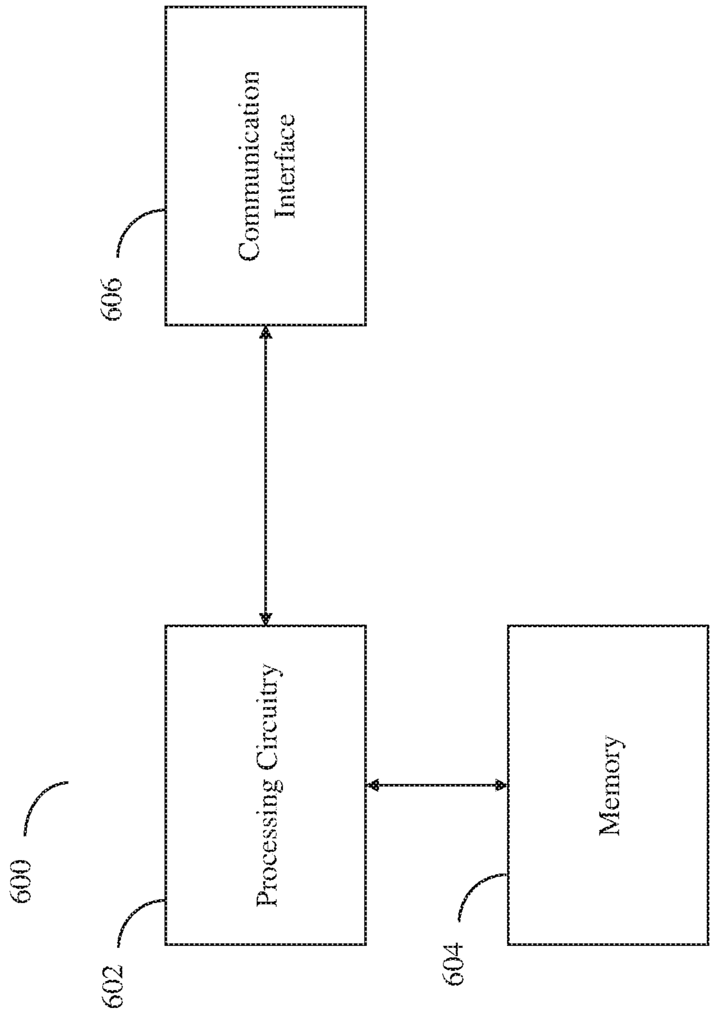
FIG. 6 is a block diagram of an apparatus that may be specifically configured in accordance with an example embodiment.

An apparatus 600 is provided in accordance with an example embodiment as shown in FIG. 6. In one embodiment, the apparatus of FIG. 6 may be embodied by the source 512, such as a file writer which, in turn, may be embodied by a server, that is configured to stream a compressed representation of the media data and associated metadata. In an alternative embodiment, the apparatus may be embodied by a client device 514, such as a file reader which may be embodied, for example, by any of the various computing devices described above. In either of these embodiments and as shown in FIG. 6, the apparatus of an example embodiment is associated with or is in communication with a processing circuitry 602, one or more memory devices 604, a communication interface 606, and optionally a user interface.

The processing circuitry 602 may be in communication with the memory device 604 via a bus for passing information among components of the apparatus 600. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment. For example, the memory device could be configured to buffer input data for processing by the processing circuitry. Additionally or alternatively, the memory device could be configured to store instructions for execution by the processing circuitry.

The apparatus 600 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment on a single chip or as a single 'system on a chip'. As such, in some cases, a chip or chipset may constitute means for performing one or more operations for providing the functionalities described herein.

The processing circuitry 602 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 602 may be configured to execute instructions stored in the memory device 604 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processing circuitry to perform the algorithms and/or operations described herein when the instructions are executed. However, in some cases, the processing circuitry may be a processor of a specific device (e.g., an image or video processing system) configured to employ an embodiment by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 606 may be any means such as a device or circuitry embodied in either hardware or a combination of hardware and software that is configured to receive and/or transmit data, including video bitstreams. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, the apparatus 600 may optionally include a user interface that may, in turn, be in communication with the processing circuitry 602 to provide output to a user, such as by outputting an encoded video bitstream and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device, and/or the like).

Picture-In-Picture

Figure 7:
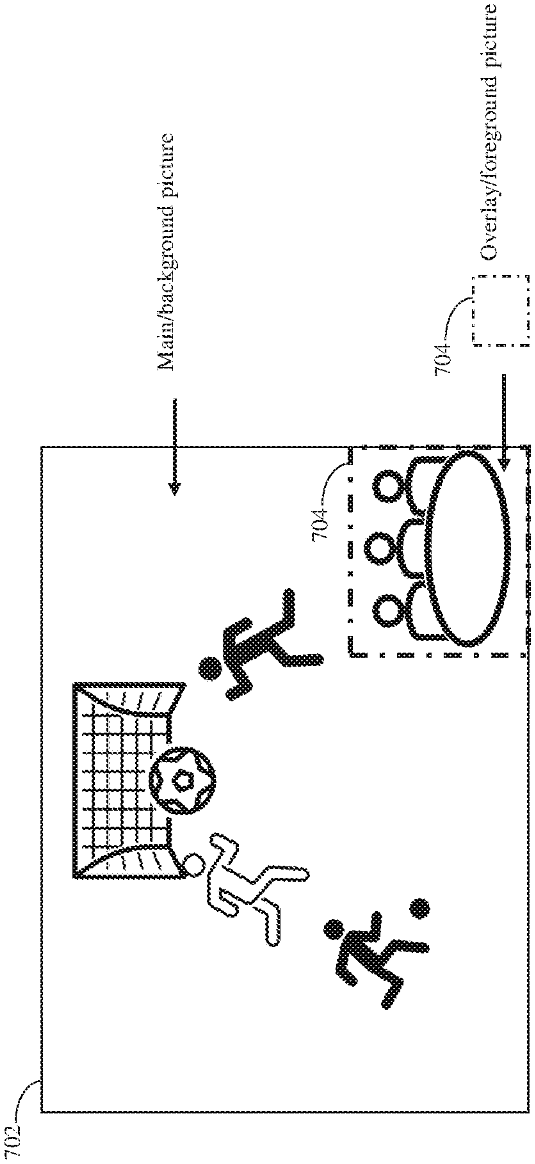
FIG. 7 illustrates an example of a picture-in-picture use case, in accordance with an embodiment.

A picture-in-picture (PIP or PiP) feature allows to overlay or include a picture with low resolution over a picture with high resolution. The picture with the higher resolution is referred to as the main picture or the background picture or the primary picture. The picture with the lower resolution, which is overlaid on the background picture, is referred to as the foreground or overlay picture or secondary picture. The overlay picture may supplement the content in the main picture. Referring to FIG. 7, it illustrates an example of a PIP use case, in accordance with an embodiment. FIG. 7 is shown to include a background picture 702 and a foreground picture 704. The background picture 702 shows a football game and the foreground picture 704 shows people sitting around a table and discussing about the football game enabling the PIP feature.

The PIP feature may be similarly described for videos. The video with the higher resolution is referred to as the main video, the background video, or the primary video. The video with the lower resolution, which is overlaid on the background video, is referred to as the foreground, an overlay video, or a secondary video. The PIP images and videos are encoded and encapsulated into image items and video tracks, respectively. The main picture, the background picture, or the primary picture is encoded and encapsulated into a main image item, the background image item, or the primary image item. The foreground, overlay, or secondary picture is encoded and encapsulated into a foreground image item, the overlay image item, in some cases is also known as pip image item or the secondary image item. The main video, the background video, or the primary video is encoded and encapsulated into a main video track, the background video track, or the primary video track. The foreground, overlay, or secondary video is encoded and encapsulated into a foreground video track, the overlay video track, or in some cases is also known as pip video track or secondary video track.

In some applications the PIP feature is implemented by generating a hard-coded PIP video, e.g., by replacing the regions in the background video with a foreground video. The hard-coded PIP video is compressed and transmitted to a receiver. As a result, viewers cannot dynamically adjust the PIP, such as to enable/disable the PIP feature (unless a copy of the background and foreground video is sent separately), to change a position of the foreground video, and the like. Another PIP application is to overlay two independent video streams at a player or receiver side, where video transport cannot provide any correlation information of the PIP video streams.

With the recent interactive media technology, the PIP feature can be dynamic, which means the position, the scaling, and alpha blending of the foreground videos can be varied during playback, which is determined by either content creator or user interactions.

The H.266/VVC standard specifies Subpictures. VVC subpictures may be used for picture-in-picture services by using both the extraction and merging properties of VVC subpictures.

The technologies under consideration (TuC) document of ISO/IEC 14496-12 (WG03_N0440_21156) provides a solution for supporting picture-in-picture feature in ISOBMFF as described in following paragraphs.

Picture-in-picture (PiP) services offer the ability to include a video with a smaller spatial resolution within a video with a bigger spatial resolution, referred to as the PiP video and the main video, respectively. A video track containing a 'subt' track reference indicates that the track contains PiP video and the main video is contained in the referenced track or any track in the alternate group to which the referenced track belongs, when present.

For each pair of PiP video and main video, a window in the main video for embedding/overlaying the PiP video, which is smaller in size than the main video, is indicated by the values of the matrix fields of the TrackHeaderBoxes of the PiP video track and the main video track, and the value of the layer field of the TrackHeaderBox of the supplementary video track is required to be less than that of the main video track, to layer the PiP video in front of the main video.

A PicInPicInfoBox, defined below, may be present in each sample entry of a PiP video track. The presence of a PicInPicInfoBox in each sample entry of a PiP video track indicates that it is enabled to replace the coded video data units representing the target PiP region in the main video with the corresponding video data units of the PiP video. In this case, it is required that the same video codec is used for coding of the PiP video and the main video. The absence of this box indicates that it is unknown whether such replacement is possible.

Syntax

```
aligned(8) class PicInPicInfoBox extends FullBox('pinp',0,0) {
  unsigned int(8) num_region_ids;
  for(i=0; i<num_region_ids; i++)
    unsigned int(16) region_id[i];
}
```

Semantics

When this box is present, the player may choose to replace the coded video data units representing the target PiP region in the main video with the corresponding coded video data units of the PiP video before sending to the video decoder for decoding. In this case, for a particular picture in the main video, the corresponding video data units of the PiP video are all the coded video data units in the decoding-time-synchronized sample in the PiP video track. In the case of VVC, when the client chooses to replace the coded video data units (which are VCL NAL units) representing the target PiP region in the main video with the corresponding VCL NAL units of the PiP video before sending to the video decoder, for each subpicture ID, the VCL NAL units in the main video are replaced with the corresponding VCL NAL units having that subpicture ID in the PiP video, without changing the order of the corresponding VCL NAL units.

num_region_ids specifies the number of the following region_id[i] fields.

region_id[i] specifies the i-th ID for the coded video data units representing the target picture-in-picture region.

The concrete semantics of the region IDs need to be explicitly specified for specific video codecs. In the case of VVC, the region IDs are subpicture IDs, and coded video data units are VCL NAL units. The VCL NAL units representing the target PiP region in the main video are those having these subpicture IDs, which are the same as the subpicture IDs in the corresponding VCL NAL units of the PiP video.

Couple of example drawbacks for the solution presented in TuC are provided below.

Codec-aware bitstream parsing is needed for performing the replacement of coded region in the main track with the PiP video track. For example, when the main video is a VVC bitstream with subpictures and encapsulated in a single video track, a file reader/player may have to parse the bitstream (e.g., high-level syntax parsing) to get the information about which NAL units belong to which subpicture ID.

In VVC, the coded video data units are not restricted to only VCL NAL units but may also include non-VCL NAL units such as adaptation parameter set (APS) NAL units for adaptive loop filtering (ALF). The TuC does not specify how such non-VCL NAL units are handled. Which non-VCL NAL units of the main bitstream should be removed, when needed. Are all non-VCL NAL units of the PiP track included in the bitstream that is reconstructed from the main and PiP tracks.

ISO Base Media File Format

Some of the available media file format standards include ISO base media file format (ISO/IEC 14496-12, which may be abbreviated ISOBMFF) and file format for NAL unit structured video (ISO/IEC 14496-15), which derives from the ISOBMFF.

Some concepts, structures, and specifications of ISOBMFF are described below as an example of a container file format, based on which some embodiments may be implemented. The features of the disclosure are not limited to ISOBMFF, but rather the description is given for one possible basis on top of which at least some embodiments may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are encapsulated into boxes. Each box is identified by a four character code (4CC) and starts with a header which informs about the type and size of the box.

In files conforming to the ISO base media file format, the media data may be provided in a media data 'mdat' box (also called MediaDataBox) and the movie 'moov' box (also called MovieBox) may be used to enclose the metadata. In some example, for a file to be operable, both of the 'mdat' and 'moov' boxes may be required to be present. The movie 'moov' box may include one or more tracks, and each track may reside in one corresponding track 'trak' box (may also be called TrackBox). A track may be one of the many types, including a media track that refers to samples formatted according to a media compression format (and its encapsulation to the ISO base media file format).

Movie fragments may be used, for example, when recording content to ISO files, for example, in order to avoid losing data when a recording application crashes, runs out of memory space, or some other incident occurs. Without movie fragments, data loss may occur because the file format may require that all metadata, for example, the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, for example, simultaneous reception and playback of a file when movie fragments are used and the initial movie box is smaller compared to a file with the same media content but structured without movie fragments.

A movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited, and the use cases mentioned above be realized.

A MovieBox may include a MovieExtendsBox ('mvex'). When present, presence of the MovieExtendsBox warns readers that there might be movie fragments in this file or stream. To know of all samples in the tracks, movie fragments are obtained and scanned in order, and their information logically added to information in the MovieBox. A MovieExtendsBox includes one TrackExtendsBox per track. A TrackExtendsBox includes default values used by the movie fragments. Some examples of the default values that can be given in TrackExtendsBox, include but are not limited to: default sample description index (e.g., default sample entry index), default sample duration, default sample size, and default sample flags. Sample flags include dependency information, such as when the sample depends on other sample(s), when other sample(s) depend on the sample, and when the sample is a sync sample.

In some examples, the media samples for the movie fragments may reside in an mdat box, when the movie fragments are in the same file as the moov box. For the metadata of the movie fragments, however, a moof box (also called MovieFragmentBox) may be provided. The moof box may include information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track. Within these structures, many fields are optional and may have default values. The metadata that may be included in the moof box may be limited to a subset of the metadata that may be included in a moov box and may be coded differently in some cases. Details regarding the boxes that can be included in a moof box may be found from the ISO base media file format specification.

The track reference mechanism may be used to associate tracks with each other. The TrackReferenceBox includes box(es), each of which provides a reference from the containing track to a set of other tracks. These references are labeled through the box type (e.g., the four-character code of the box) of the contained box(es).

The ISO Base Media File Format includes three mechanisms for timed metadata that may be associated with particular samples, for example, sample groups, timed metadata tracks, and sample auxiliary information. Derived specification may provide similar functionality with one or more of these three mechanisms.

A sample grouping in the ISO base media file format and its derivatives, such as the AVC file format and the SVC file format, may be defined as an assignment of each sample in a track to be a member of one sample group, based on a grouping criterion. A sample group in a sample grouping is not limited to being contiguous samples and may include non-adjacent samples. As there may be more than one sample grouping for the samples in a track, each sample grouping may have a type field to indicate the type of grouping. Sample groupings may be represented by two linked data structures, for example, a SampleToGroupBox (sbgp box) represents the assignment of samples to sample groups; and a SampleGroupDescriptionBox (sgpd box) including a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that may be used, for example, to indicate a sub-type of the grouping.

A track within a ISOBMFF file includes a TrackHeaderBox. The TrackHeaderBox specifies the characteristics of a single track. Exactly one TrackHeaderBox is included in a track. The syntax of TrackHeaderBox in ISOBMFF is as follows:

```
aligned(8) class TrackHeaderBox
  extends FullBox('tkhd', version, flags){
  if (version==1) {
    unsigned int(64)          creation_time;
    unsigned int(64)          modification_time;
    unsigned int(32)          track_ID;
```

-continued

```
      const unsigned int(32)          reserved = 0;
      unsigned int(64)                duration;
   } else { // version==0
      unsigned int(32)                creation_time;
      unsigned int(32)                modification_time;
      unsigned int(32)                track_ID;
      const unsigned int(32)          reserved = 0;
      unsigned int(32)                duration;
   }
   const unsigned int(32)[2]          reserved = 0;
   template int(16) layer = 0;
   template int(16) alternate_group = 0;
   template int(16) volume = {if track_is_audio 0x0100 else 0};
   const unsigned int(16)          reserved = 0;
   template int(32)[9]             matrix=
      { 0x00010000,0,0,0,0x00010000,0,0,0,0x40000000 };
      // unity matrix
   unsigned int(32) width;
   unsigned int(32) height;
}
```

version is an integer that specifies the version of this box (0 or 1 in this document)

flags is a 24-bit integer with flags; the following values are defined:

track_enabled: Flag mask is 0x000001. A value 1 indicates that the track is enabled. A disabled track (when the value of this flag is zero) is treated as the being not present;

track_in_movie: Flag mask is 0x000002. A value 1 indicates that the track, or one of its alternatives (when available) forms a direct part of the presentation. A value 0 indicates that the track does not represent a direct part of the presentation;

track_in_preview: Flag mask is 0x000004. This flag currently has no assigned meaning, and the value should be ignored by readers. In the absence of further guidance (e.g., from derived specifications), the same value as for track_in_movie should be written; and track_size_is_aspect_ratio: Flag value is 0x000008. A value 1 indicates that the width and height fields are not expressed in pixel units. The values have the same units but these units are not specified. The values are an indication of the desired aspect ratio. When the aspect ratios of this track and other related tracks are not identical, then the respective positioning of the tracks is undefined, possibly defined by external contexts.

creation_time is an integer that declares a creation time for this track (e.g., in seconds).

modification_time is an integer that declares a most recent time the track was modified (e.g., in seconds).

track_ID is an integer that uniquely identifies this track over the entire life-time of this presentation; track_IDs are never re-used and cannot be zero.

duration is an integer that indicates the duration of this track (in the timescale indicated in the MovieHeaderBox) This duration field may be indefinite (all 1s) when either there is no edit list and the MediaHeaderBox duration is indefinite (i.e. all 1s), or when an indefinitely repeated edit list is desired (see clause 8.6.6 for repeated edits). When there is no edit list and the duration is not indefinite, then the duration shall be equal to the media duration given in the MediaHeaderBox, converted into the timescale in the MovieHeaderBox. Otherwise the value of this field is equal to the sum of the durations of all of the track's edits (possibly including repetitions).

layer specifies the front-to-back ordering of video tracks; tracks with lower numbers are closer to the viewer. 0 is the normal value, and −1 would be in front of track 0, and so on.

alternate_group is an integer that specifies a group or collection of tracks. When this field is 0 there is no information on possible relations to other tracks. When this field is not 0, it should be the same for tracks that include alternate data for one another and different for tracks belonging to different such groups. Only one track within an alternate group should be played or streamed at any one time, and shall be distinguishable from other tracks in the group via attributes such as bitrate, codec, language, packet size etc. A group may have only one member.

volume is a fixed 8.8 value specifying the track's relative audio volume. Full volume is 1.0 (0x0100) and is the normal value. Its value is irrelevant for a purely visual track. Tracks may be composed by combining them according to their volume, and then using the overall MovieHeaderBox volume setting; or more complex audio composition (e.g. MPEG-4 BIFS) may be used.

matrix provides a transformation matrix for the video; (u,v,w) are restricted here to (0,0,1), hex (0,0,0x40000000).

width and height fixed-point 16.16 values are track-dependent as follows:

For text and subtitle tracks, they may, depending on the coding format, describe the suggested size of the rendering area. For such tracks, the value 0x0 may also be used to indicate that the data may be rendered at any size, that no preferred size has been indicated and that the actual size may be determined by the external context or by reusing the width and height of another track. For those tracks, the flag track_size_is_aspect_ratio may also be used.

For non-visual tracks (e.g. audio), they should be set to zero.

For all other tracks, they specify the track's visual presentation size. These need not be the same as the pixel dimensions of the images, which is documented in the sample description(s); all images in the sequence are scaled to this size, before any overall transformation of the track represented by the matrix. The pixel dimensions of the images are the default values.

In ISOBMFF, a track group enables grouping of tracks based on certain characteristics or the tracks within a group have a particular relationship. Track grouping, however, does not allow any image items in the group.

The syntax of TrackGroupBox in ISOBMFF is as follows:

```
aligned(8) class TrackGroupBox extends Box('trgr') {
}
aligned(8) class TrackGroupTypeBox(unsigned int(32) track_group_type)
extends FullBox(track_group_type, version = 0, flags = 0)
{
   unsigned int(32) track_group_id;
   // the remaining data may be specified for a particular
   track_group_type
}
```

track_group_type indicates a grouping_type and may be set, for example, to 'msrc' or 'ster' (described in detail below), or a value registered, or a value from a derived specification or registration.

'msrc' indicates that this track belongs to a multi-source presentation. The tracks that have the same value of track_group_id within a TrackGroupTypeBox of track_group_type 'msrc' are mapped as being originated from the same source. For example, a recording of a video telephony call may have both audio and video for both participants, and the value of track_group_id associated with the audio track and the video track of one participant differs from value of track_group_id associated with the tracks of the other participant.

'ster' indicates that this track is either the left or right view of a stereo pair suitable for playback on a stereoscopic display.

The pair of track_group_id and track_group_type identifies a track group within a file. The tracks that include a particular TrackGroupTypeBox having the same value of track_group_id and track_group_type belong to the same track group.

The Entity grouping is similar to track grouping but enables grouping of both tracks and image items in the same group. The entities in an entity group share a particular characteristic or have a particular relationship, as indicated by the grouping type.

Entity groups are indicated in GroupsListBox. Entity groups specified in GroupsListBox of a file-level MetaBox refer to tracks or file-level items. Entity groups specified in GroupsListBox of a movie-level MetaBox refer to movie-level items. Entity groups specified in GroupsListBox of a track-level MetaBox refer to track-level items of that track.

GroupsListBox includes EntityToGroupBoxes, each specifying one entity group.

The syntax of EntityToGroupBox in ISOBMFF is defined as follows:

```
aligned(8) class EntityToGroupBox(grouping_type, version, flags)
extends FullBox(grouping_type, version, flags) {
  unsigned int(32) group_id;
  unsigned int(32) num_entities_in_group;
  for(i=0; i<num_entities_in_group; i++)
    unsigned int(32) entity_id;
}
```

group_id is a non-negative integer assigned to a particular grouping that may not be equal to any group_id value of any other EntityToGroupBox, any item_ID value of the hierarchy level (e.g., a file, a movie or a track) that includes the GroupsListBox, or any track_ID value (when the GroupsListBox is included in the file level).

num_entities_in_group specifies a number of entity_id values mapped to this entity group.

entity_id is resolved to an item, when an item with item_ID equal to entity_id is present in the hierarchy level (e.g., a file, a, movie or a track) that includes the GroupsListBox, or to a track, when a track with track_ID equal to entity_id is present and the GroupsListBox is included in the file level.

Matroska file format is capable of, but not limited to, storing any of a video, a audio, a picture, and/or a subtitle tracks in one file. Matroska may be used as a basis format for derived file formats, such as WebM. Matroska uses extensible binary meta language (EBML) as basis. EBML specifies a binary and octet (byte) aligned format inspired by the principle of XML. EBML itself is a generalized description of the technique of binary markup. A Matroska file includes elements that make up an EBML 'document'. Elements incorporate an element ID, a descriptor for the size of the element, and the binary data itself. Elements may be nested. A Segment Element of Matroska is a container for other top-level (e.g., level 1) elements. A Matroska file may include, but is not limited to be composed of, one Segment. Multimedia data in Matroska files is organized in clusters (or cluster elements), each including typically a few seconds of multimedia data. A Cluster comprises BlockGroup elements, which in turn comprise Bbock elements. A cues element includes metadata which may assist in random access or seeking and may include file pointers or respective timestamps for seek points.

Video Encoding

Video codec includes an encoder that transforms the input video into a compressed representation suited for storage/transmission and a decoder that can uncompress the compressed video representation back into a viewable form. A video encoder and/or a video decoder may also be separate from each other, e.g., need not form a codec. Typically, an encoder discards some information in the original video sequence in order to represent the video in a more compact form (e.g., at lower bitrate).

Typical hybrid video encoders, for example, many encoder implementations of ITU-T H.263 and H.264, encode the video information in two phases. Firstly, pixel values in a certain picture area (or "block") are predicted, for example, by motion compensation means or circuit (finding and indicating an area in one of the previously coded video frames that corresponds closely to the block being coded) or by spatial means (using the pixel values around the block to be coded in a specified manner). Secondly, the prediction error, e.g., the difference between the predicted block of pixels and the original block of pixels, is coded. This is typically done by transforming the difference in pixel values using a specified transform (e.g., discrete cosine transform (DCT) or a variant of it), quantizing the coefficients and entropy coding the quantized coefficients. By varying the fidelity of the quantization process, encoder may control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction, the sources of prediction are previously decoded pictures. Intra prediction utilizes the fact that adjacent pixels within the same picture are likely to be correlated. Intra prediction can be performed in spatial or transform domain, e.g., either sample values or transform coefficients may be predicted. Intra prediction is typically exploited in intra coding, where no inter prediction is applied.

One outcome of the coding procedure is a set of coding parameters, such as motion vectors and quantized transform coefficients. Many parameters may be entropy-coded more efficiently when they are predicted first from spatially or temporally neighboring parameters. For example, a motion vector may be predicted from spatially adjacent motion vectors and the difference relative to the motion vector predictor may be coded. Prediction of coding parameters and intra prediction may be collectively referred to as in-picture prediction.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team-Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Later versions of H.265/HEVC included scalable, multiview, fidelity range extensions, three-dimensional, and screen content coding extensions which may be abbreviated SHVC, MV-HEVC, REXT, 3D-HEVC, and SCC, respectively.

SHVC, MV-HEVC, and 3D-HEVC use a common basis specification, specified in Annex F of the version 2 of the HEVC standard. This common basis comprises for example high-level syntax and semantics, e.g., specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

The Versatile Video Coding standard (which may be abbreviated VVC, H.266, or H.266/VVC) was developed by the Joint Video Experts Team (JVET), which is a collaboration between the ISO/IEC MPEG and ITU-T VCEG. Extensions to VVC are presently under development.

Some key definitions, bitstream and coding structures, and concepts of H.264/AVC and HEVC are described in this section as an example of a video encoder, decoder, encoding method, decoding method, and a bitstream structure, wherein one or more embodiments may be implemented. Some of the key definitions, bitstream and coding structures, and concepts of H.264/AVC are the same as in HEVC-hence, they are described below jointly. However, embodiments are not limited to H.264/AVC or HEVC, but rather the description is given for one possible basis on top of which various embodiments may be partly or fully realized. Many embodiments described below in the context of H.264/AVC or HEVC may apply to VVC, and the embodiments may hence be applied to VVC.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance may be verified with a hypothetical reference decoder (HRD). The standards include coding tools that help in coping with transmission errors and losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. A picture given as an input to an encoder may also be referred to as a source picture, and a picture decoded by a decoded may be referred to as a decoded picture.

The source and decoded pictures are each comprised of one or more sample arrays, such as one of the following sets of sample arrays:

- Luma (Y) only (monochrome);
- Luma and two chroma (YCbCr or YCgCo);
- Green, Blue and Red (GBR, also known as RGB); and/or
- Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use may be indicated, e.g., in a coded bitstream, e.g., by using the video usability information (VUI) syntax of H.264/AVC and/or HEVC. A component may be defined as an array or single sample from one of the three sample arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:

- In monochrome sampling there is only one sample array, which may be nominally considered the luma array.
- In 4:2:0 sampling, each of the two chroma arrays has half the height and half the width of the luma array.
- In 4:2:2 sampling, each of the two chroma arrays has the same height and half the width of the luma array.
- In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

A partitioning may be defined as a division of a set into subsets such that each element of the set is in exactly one of the subsets.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples. A CU with the maximum allowed size may be named as LCU (largest coding unit) or coding tree unit (CTU) and the video picture is divided into non-overlapping LCUs.

A CU includes one or more prediction units (PU) defining the prediction process for the samples within the CU and one or more transform units (TU) defining the prediction error coding process for the samples in the said CU. Typically, a CU includes a square block of samples with a size selectable from a predefined set of possible CU sizes. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g., motion vector information for inter predicted PUs and intra prediction directionality information for intra predicted PUs).

Each TU can be associated with information describing the prediction error decoding process for the samples within the said TU (including e.g., DCT coefficient information). Whether prediction error coding is applied or not for each CU is typically signalled at CU level. In the case there is no prediction error residual associated with the CU, it may be considered there are no TUs for the said CU. The division of the image into CUs, and division of CUs into PUs and TUs is typically signalled in the bitstream allowing the decoder to reproduce the intended structure of these units.

In HEVC, a picture may be partitioned in tiles, which are rectangular and include an integer number of LCUs. In HEVC, the partitioning to tiles forms a regular grid, where heights and widths of tiles differ from each other by one LCU at the maximum. In HEVC, a slice is defined to be an integer number of coding tree units included in one independent slice segment and all subsequent dependent slice segments (when present) that precede the next independent slice segment (when present) within the same access unit. In HEVC, a slice segment is defined to be an integer number of coding tree units ordered consecutively in the tile scan and included in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment including the data elements pertaining to the first or all coding tree units represented in the slice segment. The CUs are scanned in the raster scan order of LCUs within tiles or within a picture, when tiles are not in use. Within an LCU, the CUs have a specific scan order.

In the following paragraphs, partitioning a picture into subpictures, slices, and tiles according to H.266/VVC is described more in detail. Similar concepts may apply in other video coding specifications too.

For partitioning a picture or image may be divided into one or more tile rows and one or more tile columns. A tile is a sequence of coding tree units (CTU) that covers a rectangular region of a picture. The CTUs in a tile are scanned in raster scan order within that tile.

A slice includes an integer number of complete tiles or an integer number of consecutive complete CTU rows within a tile of a picture. Consequently, each vertical slice boundary is also a vertical tile boundary. It may be possible that a horizontal boundary of a slice is not a tile boundary but includes horizontal CTU boundaries within a tile; this occurs when a tile is split into multiple rectangular slices, each of which includes an integer number of consecutive complete CTU rows within the tile.

Generally two modes of slices are supported, for example, raster-scan slice mode and the rectangular slice mode. In the raster-scan slice mode, a slice includes a sequence of complete tiles in a tile raster scan of a picture. In the rectangular slice mode, a slice includes either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture may be defined as a rectangular region of one or more slices within a picture, wherein the one or more slices are complete. Thus, a subpicture includes one or more slices that collectively cover a rectangular region of a picture. Consequently, each subpicture boundary is also a slice boundary, and each vertical subpicture boundary is also a vertical tile boundary. The slices of a subpicture may be required to be rectangular slices.

One or both of the following conditions may be required to be fulfilled for each subpicture and tile: i) All CTUs in a subpicture belong to the same tile. ii) All CTUs in a tile belong to the same subpicture.

An independent VVC subpicture is treated like a picture in the VVC decoding process. Moreover, it may additionally be required that loop filtering across the boundaries of an independent VVC subpicture is disabled. Boundaries of a subpicture are treated like picture boundaries in the VVC decoding process when sps_subpic_treated_as_pic_flag[i] is equal to 1 for the subpicture. Loop filtering across the boundaries of a subpicture is disabled in the VVC decoding process when sps_loop_filter_across_subpic_enabled_pic_flag[i] is equal to 0.

In VVC, the feature of subpictures enables efficient extraction of subpicture(s) from one or more bitstream and merging the extracted subpictures to form another bitstream without excessive penalty in compression efficiency and without modifications of VCL NAL units (e.g., slices).

The use of subpictures in a coded video sequence (CVS), however, requires appropriate configuration of the encoder and other parameters such as SPS/PPS and so on. In VVC, a layout of partitioning of a picture to subpictures may be indicated in and/or decoded from an SPS. A subpicture layout may be defined as a partitioning of a picture to subpictures. In VVC, the SPS syntax indicates the partitioning of a picture to subpictures by providing for each subpicture syntax elements indicative of: the x and y coordinates of the top-left corner of the subpicture, the width of the subpicture, and the height of the subpicture, in CTU units. One or more of the following properties may be indicated (e.g., by an encoder) or decoded (e.g., by a decoder) or inferred (e.g., by an encoder and/or a decoder) for the subpictures collectively or per each subpicture individually: i) whether or not a subpicture is treated like a picture in the decoding process (or equivalently, whether or not subpicture boundaries are treated like picture boundaries in the decoding process); in some cases, this property excludes in-loop filtering operations, which may be separately indicated/decoded/inferred; ii) whether or not in-loop filtering operations are performed across the subpicture boundaries. When a subpicture is treated like a picture in the decoding process, any references to sample locations outside the subpicture boundaries are saturated to be within the subpicture boundaries. This may be regarded being equivalent to padding samples outside subpicture boundaries with the boundary sample values for decoding the subpicture. Consequently, motion vectors may be allowed to cause references outside subpicture boundaries in a subpicture that is extractable.

An independent subpicture (a.k.a. an extractable subpicture) may be defined as a subpicture with subpicture boundaries that are treated as picture boundaries. Additionally, it may be required that an independent subpicture has no loop filtering across the subpicture boundaries. A dependent subpicture may be defined as a subpicture that is not an independent subpicture.

In video coding, an isolated region may be defined as a picture region that is allowed to depend only on the corresponding isolated region in reference pictures and does not depend on any other picture regions in the current picture or in the reference pictures. The corresponding isolated region in reference pictures may be for example the picture region that collocates with the isolated region in a current picture. A coded isolated region may be decoded without the presence of any picture regions of the same coded picture.

A VVC subpicture with boundaries treated like picture boundaries may be regarded as an isolated region.

An intra-coded slice (also called I slice) is such that only includes intra-coded blocks. The syntax of an I slice may exclude syntax elements that are related to inter prediction. An inter-coded slice is such where blocks can be intra- or inter-coded. Inter-coded slices may further be categorized into P and B slices, where P slices are such that blocks may be intra-coded or inter-coded but only using uni-prediction, and blocks in B slices may be intra-coded or inter-coded with uni- or bi-prediction.

A motion-constrained tile set (MCTS) is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set. Additionally, the encoding of an MCTS is constrained in a manner that motion vector candidates are not derived from blocks outside the MCTS. This may be enforced by turning off temporal motion vector prediction of HEVC, or by disallowing the encoder to use the TMVP candidate or any motion vector prediction candidate following the TMVP candidate in the merge or AMVP candidate list for PUs located directly left of the right tile boundary of the MCTS except the last one at the bottom right of the MCTS. In general, an MCTS may be defined to be a tile set that is independent of any sample values and coded data, such as motion vectors, that are outside the MCTS. In some cases, an MCTS may be required to form a rectangular area. It should be understood that depending on the context, an MCTS may refer to the tile set within a picture or to the respective tile set in a sequence of pictures. The respective tile set may be, but in general need not be, collocated in the sequence of pictures.

It is noted that sample locations used in inter prediction may be saturated by the encoding and/or decoding process so that a location that would be outside the picture otherwise is saturated to point to the corresponding boundary sample of the picture. Hence, when a tile boundary is also a picture boundary, in some use cases, encoders may allow motion vectors to effectively cross that boundary or a motion vector to effectively cause fractional sample interpolation that would refer to a location outside that boundary, since the sample locations are saturated onto the boundary. In other use cases, specifically when a coded tile may be extracted from a bitstream where it is located on a position adjacent to a picture boundary to another bitstream where the tile is located on a position that is not adjacent to a picture boundary, encoders may constrain the motion vectors on picture boundaries similarly to any MCTS boundaries.

The temporal motion-constrained tile sets SEI message of HEVC can be used to indicate the presence of motion-constrained tile sets in the bitstream.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) may also apply additional filtering means to improve the quality of the output video before passing it for display and/or storing it as prediction reference for the forthcoming frames in the video sequence.

The filtering may, for example, include one more of the following: deblocking, sample adaptive offset (SAO), and/or adaptive loop filtering (ALF). H.264/AVC includes a deblocking, whereas HEVC includes both deblocking and SAO.

In typical video codecs, the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs, the predicted motion vectors are created in a predefined way, for example, calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition, to predicting the motion vector values, it can be predicted which reference picture(s) are used for motion-compensated prediction and this prediction information may be represented, for example, by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

In typical video codecs, the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g., the desired coding mode for a block and associated motion vectors. This kind of cost function uses a weighting factor λ to tie together the (exact or estimated) image distortion due to lossy coding methods and the (exact or estimated) amount of information that is required to represent the pixel values in an image area:

$$C = D + \lambda R, \quad (1)$$

where C is the Lagrangian cost to be minimized, D is the image distortion (e.g., mean squared error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account, for example, when concluding which prediction sources are available. For example, samples from a neighboring CU may be regarded as unavailable for intra prediction, when the neighboring CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload when a start code would have occurred otherwise. In order to enable straightforward gateway operation between packet- and stream-oriented systems, start code emulation prevention may always be performed regardless of whether the bytestream format is in use or not. A NAL unit may be defined as a syntax structure including an indication of the type of data to follow and bytes including that data in the form of an RBSP interspersed as necessary with emulation prevention bytes. A raw byte sequence payload (RBSP) may be defined as a syntax structure including an integer number of bytes that is encapsulated in a NAL unit. An RBSP is either empty or has the form of a string of data bits including syntax elements followed by an RBSP stop bit and followed by zero or more subsequent bits equal to 0.

NAL units includes a header and payload. In H.264/AVC and HEVC, the NAL unit header indicates the type of the NAL unit In HEVC, a two-byte NAL unit header is used for all specified NAL unit types. The NAL unit header includes one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. The abbreviation TID may be used to interchangeably with the TemporalId variable. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to tid_value does not use any picture having a TemporalId greater than tid_value as inter prediction reference. A sub-layer or a temporal sub-layer may be defined to be a temporal scalable layer (or a temporal layer, TL) of a temporal scalable bitstream, including VCL NAL units with a particular value of the TemporalId variable and the associated non-VCL NAL units. nuh_layer_id may be understood as a scalability layer identifier.

NAL units can be categorized into Video Coding Layer (VCL) NAL units and non-VCL NAL units. VCL NAL units are typically coded slice NAL units. In HEVC, VCL NAL units include syntax elements representing one or more CU.

In HEVC, abbreviations for picture types may be defined as follows: trailing (TRAIL) picture, temporal sub-layer access (TSA), step-wise temporal sub-layer access (STSA), random access decodable leading (RADL) picture, random access skipped leading (RASL) picture, Broken Link Access (BLA) picture, Instantaneous Decoding Refresh (IDR) picture, Clean Random Access (CRA) picture.

A random access point may be defined as a location within a bitstream where decoding can be started.

A random access point (RAP) picture may be defined as a picture that serves as a random access point, e.g., as a picture where decoding can be started. In some contexts, the term random-access picture may be used interchangeably with the term RAP picture.

An intra random access point (IRAP) picture in an independent layer includes only intra-coded slices. An IRAP picture belonging to a predicted layer may include P, B, and I slices, cannot use inter prediction from other pictures in the same predicted layer, and may use inter-layer prediction from its direct reference layers. In the present version of HEVC, an IRAP picture may be a BLA picture, a CRA picture or an IDR picture. The first picture in a bitstream including a base layer is an IRAP picture at the base layer. Provided the necessary parameter sets are available when they need to be activated, an IRAP picture at an independent layer and all subsequent non-RASL pictures at the independent layer in decoding order can be correctly decoded without performing the decoding process of any pictures that precede the IRAP picture in decoding order. The IRAP picture belonging to a predicted layer and all subsequent non-RASL pictures in decoding order within the same predicted layer can be correctly decoded without performing the decoding process of any pictures of the same predicted layer that precede the IRAP picture in decoding order, when the necessary parameter sets are available when they need to be activated and when the decoding of each direct reference layer of the predicted layer has been initialized. There may be pictures in a bitstream that include only intra-coded slices that are not IRAP pictures.

Some coding standards or specifications, such as H.264/AVC and H.265/HEVC, may use the NAL unit type of VCL NAL unit(s) of a picture to indicate a picture type. In H.266/VVC, the NAL unit type indicates a picture type when mixed VCL NAL unit types within a coded picture are disabled (pps_mixed_nalu_types_in_pic_flag is equal to 0 in the referenced PPS), while otherwise it indicates a subpicture type.

A non-VCL NAL unit may be, for example, one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Some coding formats specify parameter sets that may carry parameter values needed for the decoding or reconstruction of decoded pictures. A parameter may be defined as a syntax element of a parameter set. A parameter set may be defined as a syntax structure that contains parameters and that can be referred to from or activated by another syntax structure for example using an identifier.

A coding standard or specification may specify several types of parameter sets. Some types of parameter sets are briefly described in the following, but it needs to be understood that other types of parameter sets may exist and that embodiments may be applied but are not limited to the described types of parameter sets. A video parameter set (VPS) may include parameters that are common across multiple layers in a coded video sequence or describe relations between layers. Parameters that remain unchanged through a coded video sequence (in a single-layer bitstream) or in a coded layer video sequence may be included in a sequence parameter set (SPS). In addition to the parameters that may be needed by the decoding process, the sequence parameter set may optionally contain video usability information (VUI), which includes parameters that may be important for buffering, picture output timing, rendering, and resource reservation. A picture parameter set (PPS) contains such parameters that are likely to be unchanged in several coded pictures. A picture parameter set may include parameters that can be referred to by the coded image segments of one or more coded pictures. A header parameter set (HPS) has been proposed to contain such parameters that may change on picture basis. In VVC, an Adaptation Parameter Set (APS) may comprise parameters for decoding processes of different types, such as adaptive loop filtering or luma mapping with chroma scaling.

Instead of or in addition to parameter sets at different hierarchy levels (e.g., sequence and picture), video coding formats may include header syntax structures, such as a sequence header or a picture header.

A sequence header may precede any other data of the coded video sequence in the bitstream order. It may be allowed to repeat a sequence header in the bitstream, e.g., to provide a sequence header at a random access point.

A picture header may precede any coded video data for the picture in the bitstream order. A picture header may be interchangeably referred to as a frame header. Some video coding specifications may enable carriage of a picture header in a dedicated picture header NAL unit or a frame header OBU or alike. Some video coding specifications may enable carriage of a picture header in a NAL unit, OBU, or alike syntax structure that also contains coded picture data.

Out-of-band transmission, signaling or storage can additionally or alternatively be used for other purposes than tolerance against transmission errors, such as ease of access or session negotiation. For example, a sample entry of a track in a file conforming to the ISO base media file format may comprise parameter sets, while the coded data in the bitstream is stored elsewhere in the file or in another file. The phrase along the bitstream (e.g., indicating along the bitstream) may be used in claims and described embodiments to refer to out-of-band transmission, signaling, or storage in a manner that the out-of-band data is associated with the bitstream. The phrase decoding along the bitstream or alike may refer to decoding the referred out-of-band data (which may be obtained from out-of-band transmission, signaling, or storage) that is associated with the bitstream.

A SEI NAL unit may include one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC include the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient may be specified.

In HEVC, there are two types of SEI NAL units, namely the suffix SEI NAL unit and the prefix SEI NAL unit, having a different nal_unit_type value from each other. The SEI message(s) included in a suffix SEI NAL unit are associated with the VCL NAL unit preceding, in decoding order, the suffix SEI NAL unit. The SEI message(s) included in a prefix SEI NAL unit are associated with the VCL NAL unit following, in decoding order, the prefix SEI NAL unit.

A coded picture is a coded representation of a picture.

In HEVC, a coded picture may be defined as a coded representation of a picture including all coding tree units of the picture. In HEVC, an access unit (AU) may be defined as a set of NAL units that are associated with each other according to a specified classification rule, are consecutive in decoding order, and include at most one picture with any specific value of nuh_layer_id. In addition to including the VCL NAL units of the coded picture, an access unit may also including non-VCL NAL units. Said specified classification rule may, for example, associate pictures with the same output time or picture output count value into the same access unit.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

A coded video sequence may be defined as such a sequence of coded pictures in decoding order that is independently decodable and may be followed by another coded video sequence or the end of the bitstream or an end of sequence NAL unit.

In HEVC, a coded video sequence may additionally or alternatively (to the specification above) be specified to end, when a specific NAL unit, which may be referred to as an end of sequence (EOS) NAL unit, appears in the bitstream and has nuh_layer_id equal to 0.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An HEVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may start from an IDR picture. In HEVC a closed GOP may also start from a BLA_W_RADL or a BLA_N_LP picture. An open GOP coding structure is potentially more efficient in the compression compared to a closed GOP coding structure, due to a larger flexibility in selection of reference pictures.

A structure of pictures (SOP) may be defined as one or more coded pictures consecutive in decoding order, in which the first coded picture in decoding order is a reference picture at the lowest temporal sub-layer and no coded picture except potentially the first coded picture in decoding order is a RAP picture. All pictures in the previous SOP precede in decoding order all pictures in the current SOP and all pictures in the next SOP succeed in decoding order all pictures in the current SOP. A SOP may represent a hierarchical and repetitive inter prediction structure. The term group of pictures (GOP) may sometimes be used interchangeably with the term SOP and having the same semantics as the semantics of SOP.

A decoded picture buffer (DPB) may be used in the encoder and/or in the decoder.

There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

A reference picture list, such as the reference picture list 0 and the reference picture list 1, may be constructed in two steps: First, an initial reference picture list is generated. The initial reference picture list may be generated, for example, on the basis of frame_num, POC, temporal_id, or information on the prediction hierarchy such as a GOP structure, or any combination thereof. Second, the initial reference picture list may be reordered by reference picture list reordering (RPLR) syntax, also known as reference picture list modification syntax structure, which may be included in slice headers. The initial reference picture lists may be modified through the reference picture list modification syntax structure, where pictures in the initial reference picture lists may be identified through an entry index to the list.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream is some inter coding modes or it may be derived (by an encoder and a decoder), for example, using neighboring blocks in some other inter coding modes.

Several candidate motion vectors may be derived for a single prediction unit. For example, motion vector prediction HEVC includes two motion vector prediction schemes, namely the advanced motion vector prediction (AMVP) and the merge mode. In the AMVP or the merge mode, a list of motion vector candidates is derived for a PU. There are two kinds of candidates: spatial candidates and temporal candidates, where temporal candidates may also be referred to as TMVP candidates.

A candidate list derivation may be performed, for example, as follows, while it should be understood that other possibilities may exist for candidate list derivation. When the occupancy of the candidate list is not at maximum, the spatial candidates are included in the candidate list first when they are available and not already exist in the candidate list. After that, when occupancy of the candidate list is not yet at when, a temporal candidate is included in the candidate list. When the number of candidates still does not reach the maximum allowed number, the combined bi-predictive candidates (for B slices) and a zero motion vector are added in. After the candidate list has been constructed, the encoder decides the final motion information from candidates for example based on a rate-distortion optimization (RDO) decision and encodes the index of the selected candidate into the bitstream. Likewise, the decoder decodes the index of the selected candidate from the bitstream, constructs the candidate list, and uses the decoded index to select a motion vector predictor from the candidate list.

A motion vector anchor position may be defined as a position (e.g., horizontal and vertical coordinates) within a picture area relative to which the motion vector is applied. A horizontal offset and a vertical offset for the anchor position may be given in the slice header, slice parameter set, tile header, tile parameter set, or the like.

An example encoding method taking advantage of a motion vector anchor position includes: encoding an input picture into a coded constituent picture; reconstructing, as a part of said encoding, a decoded constituent picture corresponding to the coded constituent picture; encoding a spatial region into a coded tile, the encoding includes: determining a horizontal offset and a vertical offset indicative of a region-wise anchor position of the spatial region within the decoded constituent picture; encoding the horizontal offset and the vertical offset; determining that a prediction unit at position of a first horizontal coordinate and a first vertical coordinate of the coded tile is predicted relative to the region-wise anchor position, wherein the first horizontal coordinate and the first vertical coordinate are horizontal and vertical coordinates, respectively, within the spatial region; indicating that the prediction unit is predicted relative to a prediction-unit anchor position that is relative to the region-wise anchor position; deriving a prediction-unit anchor position equal to sum of the first horizontal coordinate and the horizontal offset, and the first vertical coordinate and the vertical offset, respectively; determining a motion vector for the prediction unit; and applying the motion vector relative to the prediction-unit anchor position to obtain a prediction block.

An example decoding method wherein a motion vector anchor position is used includes: decoding a coded tile into a decoded tile, the decoding including: decoding a horizontal offset and a vertical offset; decoding an indication that a prediction unit at position of a first horizontal coordinate and a first vertical coordinate of the coded tile is predicted relative to a prediction-unit anchor position that is relative to the horizontal and vertical offset; deriving a prediction-unit anchor position equal to sum of the first horizontal coordinate and the horizontal offset, and the first vertical coordinate and the vertical offset, respectively; determining a motion vector for the prediction unit; and applying the motion vector relative to the prediction-unit anchor position to obtain a prediction block.

Scalable video coding may refer to coding structure where one bitstream can include multiple representations of the content, for example, at different bitrates, resolutions or frame rates. In these cases the receiver may extract the desired representation depending on its characteristics (e.g., resolution that matches best the display device). Alternatively, a server or a network element can extract the portions of the bitstream to be transmitted to the receiver depending on, e.g., the network characteristics or processing capabilities of the receiver. A meaningful decoded representation can be produced by decoding only certain parts of a scalable bit stream. A scalable bitstream typically includes a 'base layer' providing the lowest quality video available and one or more enhancement layers that enhance the video quality when received and decoded together with the lower layers. In order to improve coding efficiency for the enhancement layers, the coded representation of that layer typically depends on the lower layers. E.g., the motion and mode information of the enhancement layer can be predicted from lower layers. Similarly, the pixel data of the lower layers can be used to create prediction for the enhancement layer.

In some scalable video coding schemes, a video signal can be encoded into a base layer and one or more enhancement layers. An enhancement layer may enhance, for example, the temporal resolution (e.g., the frame rate), the spatial resolution, or simply the quality of the video content represented by another layer or part thereof. Each layer together with all its dependent layers is one representation of the video signal, for example, at a certain spatial resolution, temporal resolution and quality level. In this document, a scalable layer together with all of its dependent layers are referred to as a 'scalable layer representation'. The portion of a scalable bitstream corresponding to a scalable layer representation can be extracted and decoded to produce a representation of the original signal at certain fidelity.

Scalability modes or scalability dimensions may include, but are not limited, to the following:

- Quality scalability: Base layer pictures are coded at a lower quality than enhancement layer pictures, which may be achieved for example using a greater quantization parameter value (e.g., a greater quantization step size for transform coefficient quantization) in the base layer than in the enhancement layer. Quality scalability may be further categorized into fine-grain or fine-granularity scalability (FGS), medium-grain or medium-granularity scalability (MGS), and/or coarse-grain or coarse-granularity scalability (CGS), as described below.
- Spatial scalability: Base layer pictures are coded at a lower resolution (e.g., have fewer samples) than enhancement layer pictures. Spatial scalability and quality scalability, particularly its coarse-grain scalability type, may sometimes be considered the same type of scalability.
- View scalability, which may also be referred to as multiview coding. The base layer represents a first view, whereas an enhancement layer represents a second view. A view may be defined as a sequence of pictures representing one camera or viewpoint. It may be considered that in stereoscopic or two-view video, one video sequence or view is presented for the left eye while a parallel view is presented for the right eye.
- Depth scalability, which may also be referred to as depth-enhanced coding. A layer or some layers of a bitstream may represent texture view(s), while other layer or layers may represent depth view(s).

It should be understood that many of the scalability types may be combined and applied together.

The term layer may be used in context of any type of scalability, including view scalability and depth enhancements. An enhancement layer may refer to any type of an enhancement, such as SNR, spatial, multiview, and/or depth enhancement. A base layer may refer to any type of a base video sequence, such as a base view, a base layer for SNR/spatial scalability, or a texture base view for depth-enhanced video coding.

A sender, a gateway, a client, or another entity may select the transmitted layers and/or sub-layers of a scalable video bitstream. Terms layer extraction, extraction of layers, or layer down-switching may refer to transmitting fewer layers than what is available in the bitstream received by the sender, the gateway, the client, or another entity. Layer up-switching may refer to transmitting additional layer(s) compared to those transmitted prior to the layer up-switching by the sender, the gateway, the client, or another entity, e.g., restarting the transmission of one or more layers whose transmission was ceased earlier in layer down-switching. Similar to layer down-switching and/or up-switching, the sender, the gateway, the client, or another entity may perform down- and/or up-switching of temporal sub-layers. The sender, the gateway, the client, or another entity may also perform both layer and sub-layer down-switching and/or up-switching. Layer and sub-layer down-switching and/or up-switching may be carried out in the same access unit or alike (e.g., virtually simultaneously) or may be carried out in different access units or alike (e.g., virtually at distinct times).

A scalable video encoder for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example, from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded. Furthermore, it needs to be understood that other types of inter-layer processing than reference-layer picture upsampling may take place instead or additionally. For example, the bit-depth of the samples of the reference-layer picture may be converted to the bit-depth of the enhancement layer and/or the sample values may undergo a mapping from the color space of the reference layer to the color space of the enhancement layer.

A scalable video coding and/or decoding scheme may use multi-loop coding and/or decoding, which may be characterized as follows. In the encoding/decoding, a base layer picture may be reconstructed/decoded to be used as a motion-compensation reference picture for subsequent pictures, in coding/decoding order, within the same layer or as a reference for inter-layer (or inter-view or inter-component) prediction. The reconstructed/decoded base layer picture may be stored in the DPB. An enhancement layer picture may likewise be reconstructed/decoded to be used as a motion-compensation reference picture for subsequent pictures, in coding/decoding order, within the same layer or as reference for inter-layer (or inter-view or inter-component) prediction for higher enhancement layers, when any. In addition to reconstructed/decoded sample values, syntax element values of the base/reference layer or variables derived from the syntax element values of the base/reference layer may be used in the inter-layer/inter-component/inter-view prediction.

Inter-layer prediction may be defined as prediction in a manner that is dependent on data elements (e.g., sample values or motion vectors) of reference pictures from a different layer than the layer of the current picture (being encoded or decoded). Many types of inter-layer prediction exist and may be applied in a scalable video encoder/decoder. The available types of inter-layer prediction may for example depend on the coding profile according to which the bitstream or a particular layer within the bitstream is being encoded or, when decoding, the coding profile that the bitstream or a particular layer within the bitstream is indicated to conform to. Alternatively or additionally, the available types of inter-layer prediction may depend on the types of scalability or the type of an scalable codec or video coding standard amendment (e.g. SHVC, MV-HEVC, or 3D-HEVC) being used.

A direct reference layer may be defined as a layer that may be used for inter-layer prediction of another layer for which the layer is the direct reference layer. A direct predicted layer may be defined as a layer for which another layer is a direct reference layer. An indirect reference layer may be defined as a layer that is not a direct reference layer of a second layer but is a direct reference layer of a third layer that is a direct reference layer or indirect reference layer of a direct reference layer of the second layer for which the layer is the indirect reference layer. An indirect predicted layer may be defined as a layer for which another layer is an indirect reference layer. An independent layer may be defined as a layer that does not have direct reference layers. In other words, an independent layer is not predicted using inter-layer prediction. A non-base layer may be defined as any other layer than the base layer, and the base layer may be defined as the lowest layer in the bitstream. An independent non-base layer may be defined as a layer that is both an independent layer and a non-base layer.

Similarly to MVC, in MV-HEVC, inter-view reference pictures can be included in the reference picture list(s) of the current picture being coded or decoded. SHVC uses multi-loop decoding operation (unlike the SVC extension of H.264/AVC). SHVC may be considered to use a reference index based approach, i.e. an inter-layer reference picture can be included in a one or more reference picture lists of the current picture being coded or decoded (as described above).

For the enhancement layer coding, the concepts and coding tools of HEVC base layer may be used in SHVC, MV-HEVC, and/or alike. However, the additional inter-layer prediction tools, which employ already coded data (including reconstructed picture samples and motion parameters a.k.a motion information) in reference layer for efficiently coding an enhancement layer, may be integrated to SHVC, MV-HEVC, and/or alike codec.

A constituent picture may be defined as such part of an enclosing (de) coded picture that corresponds to a representation of an entire input picture. In addition to the constituent picture, the enclosing (de) coded picture may comprise other data, such as another constituent picture.

Frame packing may be defined to include arranging more than one input picture, which may be referred to as (input) constituent frames or constituent pictures, into an output picture. In general, frame packing is not limited to any particular type of constituent frames or the constituent frames need not have a particular relation with each other. In many cases, frame packing is used for arranging constituent frames of a stereoscopic video clip into a single picture sequence. The arranging may include placing the input pictures in spatially non-overlapping areas within the output picture. For example, in a side-by-side arrangement, two input pictures are placed within an output picture horizontally adjacently to each other. The arranging may also include partitioning of one or more input pictures into two or more constituent frame partitions and placing the constituent frame partitions in spatially non-overlapping areas within the output picture. The output picture or a sequence of frame-packed output pictures may be encoded into a bitstream e.g. by a video encoder. The bitstream may be decoded, e.g., by a video decoder. The decoder or a post-processing operation after decoding may extract the decoded constituent frames from the decoded picture(s) e.g. for displaying.

Video coding specifications may include a set of constraints for associating data units (e.g. NAL units in H.264/AVC or HEVC) into access units. These constraints may be used to conclude access unit boundaries from a sequence of NAL units. For example, the following is specified in the HEVC standard:

- An access unit includes one coded picture with nuh_layer_id equal to 0, zero or more VCL NAL units with nuh_layer_id greater than 0 and zero or more non-VCL NAL units;
- Let firstBlPicNalUnit be the first VCL NAL unit of a coded picture with nuh_layer_id equal to 0. The first of any of the following NAL units preceding firstBlPicNalUnit and succeeding the last VCL NAL unit preceding firstBlPicNalUnit, when present, specifies the start of a new access unit;
- access unit delimiter NAL unit with nuh_layer_id equal to 0 (when present);
- VPS NAL unit with nuh_layer_id equal to 0 (when present);
- SPS NAL unit with nuh_layer_id equal to 0 (when present);
- PPS NAL unit with nuh_layer_id equal to 0 (when present);
- Prefix SEI NAL unit with nuh_layer_id equal to 0 (when present);
- NAL units with nal_unit_type in the range of RSV_NVCL41 . . . . RSV_NVCL44 with nuh_layer_id equal to 0 (when present);
- NAL units with nal_unit_type in the range of UNSPEC48 . . . . UNSPEC55 with nuh_layer_id equal to 0 (when present);
- The first NAL unit preceding firstBlPicNalUnit and succeeding the last VCL NAL unit preceding firstBlPicNalUnit, when any, can only be one of the above-listed NAL units; and
- When there is none of the above NAL units preceding firstBlPicNalUnit and succeeding the last VCL NAL preceding firstBlPicNalUnit, when present, firstBlPicNalUnit starts a new access unit.

Access unit boundary detection may be based on, but may not be limited to, one or more of the following:

- Detecting that a VCL NAL unit of a base-layer picture is the first VCL NAL unit of an access unit, e.g., on the basis that:
  - the VCL NAL unit includes a block address or alike that is the first block of the picture in decoding order; and/or
  - the picture order count, picture number, or similar decoding or output order or timing indicator differs from that of the previous VCL NAL unit(s).
- Having detected the first VCL NAL unit of an access unit, concluding based on predefined rules, e.g., based on nal_unit_type which non-VCL NAL units that precede the first VCL NAL unit of an access unit and succeed the last VCL NAL unit of the previous access unit in decoding order belong to the access unit.

Selected Features of the NAL Unit File Format (ISO/IEC 14496-15)

A sample according to ISO/IEC 14496-15 includes one or more length-field-delimited NAL units. The length field may be referred to as NALULength or NALUnitLength. The NAL units in samples do not begin with start codes, but rather the length fields are used for concluding NAL unit boundaries. The scheme of length-field-delimited NAL units may also be referred to as length-prefixed NAL units.

The NALUMapEntry specified in ISO/IEC 14496-15 may be used to assign an identifier, called groupID, to each NAL unit. The NALUMapEntry, when present, is linked to a sample group description providing the semantics of that groupID. This link is provided by setting the grouping_type_parameter of the SampleToGroupBox of type 'nalm' to the four-character code of the associated sample grouping type.

When a track includes a SampleToGroupBox of type 'nalm' associated with grouping_type_parameter groupType, NAL units of the mapped sample are indirectly associated with the sample group description of type groupType through the groupID of the NALUMapEntry applicable for that sample. When a track includes a SampleToGroupBox of type groupType, each sample is directly mapped to the sample group description of type groupType through the SampleToGroupBox of type groupType and all NAL units of the mapped sample are associated with the same groupID.

ISO/IEC 14496-15 specifies RectangularRegionGroupEntry. The RectangularRegionGroupEntry may be used to describe a rectangular region. A rectangular region may be defined as a rectangle that does not contain holes and does not overlap with any other rectangular region of the same picture. A more detailed definition of a rectangular region may depend on the codec. The syntax of RectangularRegionGroupEntry may be as follows:

```
class RectangularRegionGroupEntry( ) extends VisualSampleGroupEntry
('trif')
{
  unsigned int(16) groupID;
  unsigned int(1) rect_region_flag;
  if (!rect_region_flag)
    bit(7) reserved = 0;
  else {
```

-continued

```
    unsigned int(2) independent_idc;
    unsigned int(1) full_picture;
    unsigned int(1) filtering_disabled;
    unsigned int(1) has_dependency_list;
    bit(2) reserved = 0;
    if (!full_picture) {
      unsigned int(16) horizontal_offset;
      unsigned int(16) vertical_offset;
    }
    unsigned int(16) region_width;
    unsigned int(16) region_height;
    if (has_dependency_list) {
      unsigned int(16) dependency_rect_region_count;
      for (i=1; i <= dependency_rect_region_count; i++)
        unsigned int(16) dependencyRectRegionGroupID;
  }
}
```

The following paragraphs include the semantics of some of the syntax elements of RectangularRegionGroupEntry.

groupID is a unique identifier for the rectangular region group described by this sample group entry. The value of groupID in a rectangular region group entry is greater than 0. The value 0 is reserved for a special use. When there is SampleToGroupBox of type 'nalm' and grouping_type_parameter equal to 'trif', a SampleGroupDescriptionBox of type 'trif' is present, and the following applies:

The value of groupID in a rectangular region group entry is equal to the groupID in one of the entries of NALUMapEntry.

A NAL unit being mapped to groupID 0 by a NALUMapEntry implies that the NAL unit is required for decoding any rectangular region in the same coded picture as this NAL unit.

There can be multiple rectangular region group entries with the same values of horizontal_offset, vertical_offset, region_width and region_height, respectively, but with different groupID values, for describing varying dependencies.

rect_region_flag equal to 1 specifies that the region covered by the NAL units within a picture and associated with this rectangular region group entry is a rectangular region, and further information of the rectangular region is provided by subsequent fields in this rectangular region group entry. The value 0 specifies that the region covered by the NAL units within a picture and associated with this rectangular region group entry is not a rectangular region, and no further information of the region is provided in this rectangular region group entry.

horizontal_offset and vertical_offset give respectively the horizontal and vertical offsets of the top-left pixel of the rectangular region that is covered by the NAL units in each rectangular region associated with this rectangular region group entry, relative to the top-left pixel of the base region, in luma samples. The base region used in the RectangularRegionGroupEntry is the picture to which the NAL units in a rectangular region associated with this rectangular region group entry belongs.

region_width and region_height give respectively the width and height of the rectangular region that is covered by the NAL units in each rectangular region associated with this rectangular region group entry, in luma samples.

Video Communication or Transmission Systems

In many video communication or transmission systems, transport mechanisms, and multimedia container file formats, there are mechanisms to transmit or store a scalability layer separately from another scalability layer of the same bitstream, e.g., to transmit or store the base layer separately from the enhancement layer(s). It may be considered that layers are stored in or transmitted through separate logical channels. For example, in ISOBMFF, the base layer can be stored as a track and each enhancement layer can be stored in another track, which may be linked to the base-layer track using so-called track references.

Many video communication or transmission systems, transport mechanisms, and multimedia container file formats provide means to associate coded data of separate logical channels, such as of different tracks or sessions, with each other. For example, there are mechanisms to associate coded data of the same access unit together. For example, decoding or output times may be provided in the container file format or transport mechanism, and coded data with the same decoding or output time may be considered to form an access unit.

Dynamic Adaptive Streaming with HTTP (MPEG-DASH)

Recently, Hypertext Transfer Protocol (HTTP) has been widely used for the delivery of real-time multimedia content over the Internet, such as in video streaming applications. Unlike the use of the Real-time Transport Protocol (RTP) over the User Datagram Protocol (UDP), HTTP is easy to configure and is typically granted traversal of firewalls and network address translators (NAT), which makes it attractive for multimedia streaming applications.

Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: 'Transparent end-to-end packet-switched streaming service (PSS); protocols and codecs'). MPEG took 3GPP AHS Release 9 as a starting point for the MPEG DASH standard (ISO/IEC 23009-1: 'Dynamic adaptive streaming over HTTP (DASH)-Part 1: Media presentation description and segment formats,' International Standard, 2nd Edition, 2014). 3GPP continued to work on adaptive HTTP streaming in communication with MPEG and published 3GP-DASH (Dynamic Adaptive Streaming over HTTP; 3GPP TS 26.247: 'Transparent end-to-end packet-switched streaming Service (PSS); Progressive download and dynamic adaptive Streaming over HTTP (3GP-DASH)'. MPEG DASH and 3GP-DASH are technically close to each other and may therefore be collectively referred to as DASH. Streaming systems similar to MPEG-DASH include, for example, HTTP live streaming (a.k.a. HLS), specified in the IETF RFC 8216. For a detailed description of said adaptive streaming system, all providing examples of a video streaming system, wherein the embodiments may be implemented, a reference is made to the above standard documents. It must be note that various embodiments are not limited to the above standard documents, but rather a description is given for one possible basis on top of which the these embodiment may be partly or fully realized.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

In DASH, the multimedia content may be stored on an HTTP server and may be delivered using HTTP. The content may be stored on the server in two parts: media presentation description (MPD), which describes a manifest of the available content, its various alternatives, their URL addresses, and other characteristics; and segments, which include the actual multimedia bitstreams in the form of chunks, in a single or multiple files. The MPD provides the necessary information for clients to establish a dynamic adaptive streaming over HTTP. The MPD includes information describing media presentation, such as an HTTP-uniform resource locator (URL) of each Segment to make GET Segment request. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using, e.g., HTTP GET requests. After appropriate buffering to allow for network throughput variations, the client may continue fetching the subsequent segments and monitor the network bandwidth fluctuations. The client may decide how to adapt to the available bandwidth by fetching segments of different alternatives (with lower or higher bitrates) to maintain an adequate buffer.

In the context of DASH, the following definitions may be used: a media content component or a media component may be defined as one continuous component of the media content with an assigned media component type that can be encoded individually into a media stream. Media content may be defined as one media content period or a contiguous sequence of media content periods. Media content component type may be defined as a single type of media content such as audio, video, or text. A media stream may be defined as an encoded version of a media content component.

In DASH, a hierarchical data model is used to structure media presentation as follows. A media presentation includes a sequence of one or more periods, each period includes one or more groups, each group includes one or more adaptation sets, each adaptation sets includes one or more representations, each representation includes one or more segments. A group may be defined as a collection of adaptation sets that are not expected to be presented simultaneously. An adaptation set may be defined as a set of interchangeable encoded versions of one or several media content components. A Representation is one of the alternative choices of the media content or a subset thereof typically differing by the encoding choice, e.g., by bitrate, resolution, language, codec, and the like. The segment includes certain duration of media data, and metadata to decode and present the included media content. A Segment is identified by a URI and can typically be requested by a HTTP GET request. A segment may be defined as a unit of data associated with an HTTP-URL and optionally a byte range that are specified by an MPD.

An initialization segment may be defined as a segment including metadata that is necessary to present the media streams encapsulated in media segments. In ISOBMFF based segment formats, an initialization segment may include the Movie Box ('moov') which may not include metadata for any samples, e.g., any metadata for samples is provided in 'moof' boxes.

A media segment includes certain duration of media data for playback at a normal speed, such duration is referred as media segment duration or segment duration. The content producer or service provider may select the segment duration according to the desired characteristics of the service. For example, a relatively short Segment duration may be used in a live service to achieve a short end-to-end latency. The reason is that Segment duration is typically a lower bound on the end-to-end latency perceived by a DASH client since a segment is a discrete unit of generating media data for DASH. Content generation is typically done such a manner that a whole Segment of media data is made available for a server. Furthermore, many client implementations use a segment as the unit for GET requests. Thus, in typical arrangements for live services a segment may be requested by a DASH client when the whole duration of a media segment is available as well as encoded and encapsulated into a segment. For on-demand service, different strategies of selecting segment duration may be used.

A segment may be further partitioned into subsegments, e.g., to enable downloading segments in multiple parts. Subsegments may be required to include complete access units. Subsegments may be indexed by segment index box, which includes information to map presentation time range and byte range for each subsegment. The segment index box may also describe subsegments and stream access points in the segment by signaling their durations and byte offsets. A DASH client may use the information obtained from segment index box(es) to make a HTTP GET request for a specific subsegment using byte range HTTP request. When a relatively long segment duration is used, then subsegments may be used to keep the size of HTTP responses reasonable and flexible for bitrate adaptation. The indexing information of a segment may be put in the single box at the beginning of that segment or spread among many indexing boxes in the segment. Different methods of spreading are possible, such as hierarchical, daisy chain, and hybrid. This technique may avoid adding a large box at the beginning of the segment and therefore may prevent a possible initial download delay.

DASH supports rate adaptation by dynamically requesting Media Segments from different Representations within an adaptation set to match varying network bandwidth. When a DASH client switches up/down representation, coding dependencies within representation have to be taken into account. A representation switch may only happen at a random access point (RAP), which is typically used in video coding techniques such as H.264/AVC. In DASH, a more general concept named SAP is introduced to provide a codec-independent solution for accessing a representation and switching between representations. In DASH, a SAP is specified as a position in a representation that enables playback of a media stream to be started using only the information included in representation data starting from that position onwards (preceded by initializing data in the initialization segment, when present). Hence, representation switching may be performed in SAP.

An end-to-end system for DASH may be described as follows. The media content is provided by an origin server, which may be a conventional web (HTTP) server. The origin server may be connected with a content delivery network (CDN) over which the streamed content is delivered to and stored in edge servers. The MPD allows signaling of multiple base URLs for the content, which can be used to announce the availability of the content in different edge servers. Alternatively, the content server may be directly connected to the Internet. Web proxies may reside on the path of routing the HTTP traffic between the DASH clients and the origin or edge server from which the content is requested. Web proxies cache HTTP messages and hence can serve clients' requests with the cached content. They are commonly used by network service providers, as they reduce the required network bandwidth from the proxy towards origin or edge servers. For end-users HTTP caching provide shorter latency. DASH clients are connected to the Internet through an access network, such as a mobile cellular network. The mobile network may comprise mobile edge servers or mobile edge cloud, operating similarly to a CDN edge server and/or web proxy.

Picture-in-picture video display feature (described above) operates in the decoded raw picture domain. This approach may waste resources, e.g., a portion of the main video which is not displayed is transmitted and decoded. Furthermore, the coded picture-in-picture video is decoded with a separate video decoder instance compared to the main video. In an example, VVC subpictures or HEVC motion constrained tiles (MCTS) features paired together with appropriate signaling on the transport/storage level may alleviate the problem.

A method, entity, or an apparatus is defined which:
- takes
  - a first encoded bitstream containing one or more independently coded VVC subpictures;
  - a second encoded bitstream containing one or more independently coded VVC subpictures; and/or
  - where the resolution of one or more VVC subpictures in the second encoded bitstream matches the resolution of corresponding one or more VVC subpictures in the first encoded bitstream;
- as input, and provides:
  - an encapsulated file with a first track and a second track,
  - wherein the first track includes the first encoded bitstream containing one or more independently coded VVC subpictures,
  - the second track includes the second encoded bitstream including one or more independently coded VVC subpictures,
  - wherein the method, entity or apparatus is further caused to include the following information in the encapsulated file:
    - the picture-in-picture relationship between the said first track and the said second track;
    - the data units of the one or more independently coded VVC subpictures in the said first encoded bitstream of the said first track can be replaced by the data units of the one or more independently coded VVC subpictures of the said second encoded bitstream of the said second track; and/or
    - the data units indicated either by a byte range or according to the corresponding NAL units specified by the coding standard used for encoding the bitstreams (e.g., NAL units defined in VVC standard)

A method, entity, or an apparatus is defined which:
- takes as input
  - a file with a first track and a second track;
  - wherein the first track comprises the first encoded bitstream containing one or more independently coded VVC subpictures;
  - the second track comprises the second encoded bitstream containing one or more independently coded VVC subpictures;
  - wherein the method, entity, or apparatus is further caused to parse the following information from the file:
    - the picture-in-picture relationship between the said first track and the said second track;
    - the data units of the one or more independently coded VVC subpictures in the said first encoded bitstream of the said first track can be replaced by the data units of the one or more independently coded VVC subpictures of the said second encoded bitstream of the said second track; and/or
    - the data units indicated either by a byte range or according to the corresponding NAL units specified by the coding standard used for encoding the bitstreams (e.g., NAL units defined in VVC standard)
  - reconstructing a third bitstream by replacing the units of the one or more independently coded VVC subpictures in the said first encoded bitstream of the said first track by the data units of the one or more independently coded VVC subpictures of the said second encoded bitstream of the said second track using the parsed information,
- decoding and/or playing the third bitstream.

In some embodiments, constructing the encapsulated file includes writing in the encapsulated file:
- an NALUmapentry assigning a unique group ID to one or more NAL units for the first encoded bitstreams comprised in the first track; and
- a syntax structure identifying the group ID of all those NAL units which are expected to be replaced by the corresponding NAL units of the foreground bitstreams of the second track.

The syntax structure identifying the group ID values of NAL units which are expected to be replaced may for example be an extract and merge sample group or a PicInPicInfoEntry as described in embodiments below.

In some embodiments, constructing the encapsulated file includes writing in the encapsulated file:
- an NALUmapentry assigning a unique group ID to one or more NAL units for the first encoded bitstreams comprised in the first track; and
- an extract and merge sample group, the extract and merge sample group carrying the group ID of all those NAL units which are expected to be replaced by the corresponding NAL units of the foreground bitstreams of the second track.

Various embodiments are described by using an example scenario below. A first picture (may also be referred to as the main picture, the background picture, or the primary picture) is encoded with having 'n' independent subpictures by using any video coding standard which supports coding of subpictures, for example, the subpictures defined in H.266/VVC standard. A second picture (may also be referred to as the foreground picture, the overlay picture, the secondary picture) is encoded with one or more independent subpictures where the resolution of one or more independent subpictures in the second picture matches or substantially matches the resolution of one or more independent subpictures in the first picture.

The encoded bitstreams may be encapsulated, for example, based on ISOBMFF and/or its extensions. The encapsulated file may be further fragmented/segmented for fragmented/segmented delivery. The encoded bitstream of the first picture is encapsulated into a first track. The encoded bitstream of the second picture is encapsulated into a second track.

In an embodiment, the first track includes a NALUMapEntry, which is used to assign a unique identifier, by using groupID, to each NAL unit within the first track.

In an embodiment, an extract and merge sample group is defined. The extract and merge sample group is included in the first track. The extract and merge sample group carries the groupID of those NAL units which are expected to be replaced by the corresponding NAL units of the foreground bitstream comprised in the second track.

In an embodiment, the NAL units identified by the groupID in the extract and merge sample group may form, for example, a rectangular region.

In an embodiment, the extract and merge sample group may include information about the position and area occupied by the NAL units identified by the unique groupID in the first track.

To support the picture-in-picture feature the VVC subpicture in the first encoded bitstream may be replaced by the subpicture in the second encoded bitstream. This action may further require modifications to SPS and/or PPS, for example, to rewrite the Subpicture ID signalled in, for example, SPS and/or PPS. Hence to ease the SPS and PPS rewriting the following information may be signalled.

In an embodiment, an extract and merge sample group may include at least one of:

- an indication of whether selected subpicture IDs should be changed in PPS or SPS NAL units;
- the length (in bits) of subpicture ID syntax elements;
- the bit position of subpicture ID syntax elements in the included RBSP;
- a flag indicating whether start code emulation prevention bytes are present before or within subpicture IDs;
- the parameter set ID of the parameter set including the subpicture IDs;
- the bit position of the pps_mixed_nalu_types_in_pic_flag syntax element in the included RBSP; or
- the parameter set ID of the parameter set including the pps_mixed_nalu_types_in_pic_flag syntax element.

Embodiments may be realized with the extract and merge sample group description entry having different sets of syntax elements. Some example embodiments are provided below, but it needs to be understood that other embodiments may likewise be realized with different selection of syntax elements to be included in the sample group description entry.

In an example embodiment, the extract and merge sample group in ISOBMFF may be defined as follows:

```
aligned(8) class SubpicExtractAndMergeEntry( ) extends
VisualSampleGroupEntry('exme')
{
  unsigned int(16) groupID;
}
```

In an example embodiment, the extract and merge sample group in ISOBMFF may be defined as follows:

```
aligned(8) class ExtractAndMergeEntry( ) extends
VisualSampleGroupEntry('exme')
{
  unsigned int(32) groupID_info_4cc;
  unsigned int(16) groupID_to_replace;
}
```

The semantics for the syntax above may be specifies as follows: groupID_info_4cc specifies the grouping type parameter value of the NAL unit map sample group that is associated with this sample group. The groupID_info_4cc may be equal to 'trif', when a RectangularRegionGroupEntry is present, or 'exme', which indicates that the groupID values in the NAL unit map are only used for indicating NAL units that may be replaced as specified in this ExtractAndMerge sample group. groupID_to_replace specifies the groupID value in the NAL unit map sample group for the NAL units that may be replaced by the NAL units of the PiP track.

For the above-described syntax and semantics, the following may be specified: When present, the ExtractAndMergeEntry indicates an identifier, called groupID_to_replace, to a region that could be replaced in the main track by the PiP video track. When an ExtractAndMerge sample group is present, the same track shall also have a NAL unit map sample group with grouping type parameter equal to groupID_info_4cc. The NAL units in the main track that may be replaced by the NAL units of the PiP track have the groupID value in the NAL unit map sample group equal to groupID_to_replace. When groupID_info_4cc is equal to 'trif' in a track, the same track shall include a SampleGroupDescriptionBox of type 'trif' with entries constrained as follows: rect_region_flag shall be equal to 1 and full_picture shall be equal to 0.

In an example embodiment, the extract and merge sample group in ISOBMFF may be defined as follows:

```
aligned(8) class SubpicExtractAndMergeEntry( ) extends
VisualSampleGroupEntry('exme')
{
  unsigned int(16) groupID[];
  // array until the end of the sample group entry
}
```

In the syntax above, the number of array elements in the groupID array may be equal to the number of track references of a certain type, such as 'mesr' (which may refer to "merge source"). The 'mesr' track reference may be present in the main track and point to the PIP tracks that may be used with the main track. The value of groupID [i] (for different values of i) may correspond to the i-th 'mesr' track reference and hence defined the groupID value that the track referenced by the i-th 'mesr' track reference may replace.

In another example embodiment, the extract and merge sample group in ISOBMFF may be defined as follows:

```
aligned(8) class SubpicExtractAndMergeEntry( ) extends
VisualSampleGroupEntry('exme')
{
  unsigned int(16) groupID;
  unsigned int(4) subpic_id_len_minus1;
  unsigned int(12) subpic_id_bit_pos;
  unsigned int(1) start_code_emul_flag;
  unsigned int(1) pps_sps_subpic_id_flag;
  unsigned int(10) pps_mix_nalu_types_in_pic_bit_pos;
  if (pps_sps_subpic_id_flag)
    unsigned int(6) pps_id;
    bit(6) reserved = 0;
  else {
    unsigned int(4) sps_id;
  }
}
```

In an example embodiment, the extract and merge sample group in ISOBMFF may be defined as follows:

```
aligned(8) class SubpicExtractAndMergeEntry( ) extends
VisualSampleGroupEntry('exme')
{
  unsigned int(16) groupID;
  unsigned int(1) rect_region_flag;
  if (!rect_region_flag)
    bit(7) reserved = 0;
  else {
    unsigned int(1) full_picture;
    unsigned int(1) filtering_disabled;
    bit(6) reserved = 0;
    if (!full_picture) {
      unsigned int(16) horizontal_offset;
      unsigned int(16) vertical_offset;
    }
    unsigned int(16) region_width;
    unsigned int(16) region_height;
  }
  unsigned int(4) subpic_id_len_minus1;
  unsigned int(12) subpic_id_bit_pos;
  unsigned int(1) start_code_emul_flag;
  unsigned int(1) pps_sps_subpic_id_flag;
  unsigned int(10) pps_mix_nalu_types_in_pic_bit_pos;
  if (pps_sps_subpic_id_flag)
    unsigned int(6) pps_id;
    bit(6) reserved = 0;
  else {
    unsigned int(4) sps_id;
  }
}
```

groupID is a unique identifier for the extract and merge group described by this sample group entry.

rect_region_flag equal to 1 specifies that the region covered by the NAL units within a picture and associated with this extract and merge group entry is a rectangular region, and further information of the rectangular region may be provided by subsequent fields in this extract and merge group entry. The value 0 specifies that the region covered by the NAL units within a picture and associated with this extract and merge group entry is not a rectangular region, and no further information of the region is provided in this extract and merge group entry.

full_picture, when set, indicates that each rectangular region associated with extract and merge group entry is a complete picture, in which case region_width and region_height shall be set to the width and height, respectively, of the complete picture.

filtering_disabled, when set, indicates that for each rectangular region associated with this extract and merge group entry the in-loop filtering operation does not require access to pixels adjacent to this rectangular region, e.g., bit-exact reconstruction of the rectangular region may be possible without decoding the adjacent rectangular regions.

horizontal_offset and vertical_offset give respectively the horizontal and vertical offsets of the top-left pixel of the rectangular region that is covered by the NAL units in each rectangular region associated with this extract and merge group entry, relative to the top-left pixel of the base region, in luma samples. The base region used in the SubpicExtractAndMergeEntry is the picture to which the NAL units in a rectangular region associated with this extract and merge group entry belongs.

region_width and region_height give the width and height respectively of the rectangular region that is covered by the NAL units in each rectangular region associated with this extract and merge group entry, in luma samples.

subpic_id_len_minus1 plus 1 specifies the number of bits in subpicture identifier syntax elements in PPS or SPS, whichever is referenced by this structure.

subpic_id_bit_pos specifies the bit position starting from 0 of the first bit of the first subpicture ID syntax element in the referenced PPS or SPS RBSP.

start_code_emul_flag equal to 0 specifies that start code emulation prevention bytes are not present before or within subpicture IDs in the referenced PPS or SPS NAL unit. start_code_emul_flag equal to 1 specifies that start code emulation prevention bytes may be present before or within subpicture IDs in the referenced PPS or SPS NAL unit.

pps_sps_subpic_id_flag, when equal to 1, specifies that the PPS NAL units applying to the samples mapped to this sample group description entry contain subpicture ID syntax elements. pps_sps_subpic_id_flag, when equal to 0, specifies that the SPS NAL units applying to the samples mapped to this sample group description entry contain subpicture ID syntax elements.

pps_id, when present, specifies the PPS ID of the PPS applying to the samples mapped to this sample group description entry.

sps_id, when present, specifies the SPS ID of the SPS applying to the samples mapped to this sample group description entry.

pps_mix_nalu_types_in_pic_bit_pos specifies the bit position starting from 0 of the pps_mixed_nalu_types_in_pic_flag syntax element in the referenced PPS RBSP.

The second track includes a TrackReferenceBox with reference_type 'subt' indicating the track contains PiP video and the main video is contained in the referenced track or any track in the alternate group to which the referenced track belongs, when present.

When only a subset of subpictures in the second encoded bitstream included in the second track participate in the picture-in-picture feature, then the following information may be additional required.

In an embodiment, the second track includes a NALUMapEntry which may be used to assign a unique identifier, by using groupID, to each NAL unit within the second track.

In an embodiment, an extract and merge sample group is included in the second track. The extract and merge sample group carries the groupID of those NAL units which are expected to replace the corresponding NAL units of the background bitstream comprised in the first track.

Figure 8:
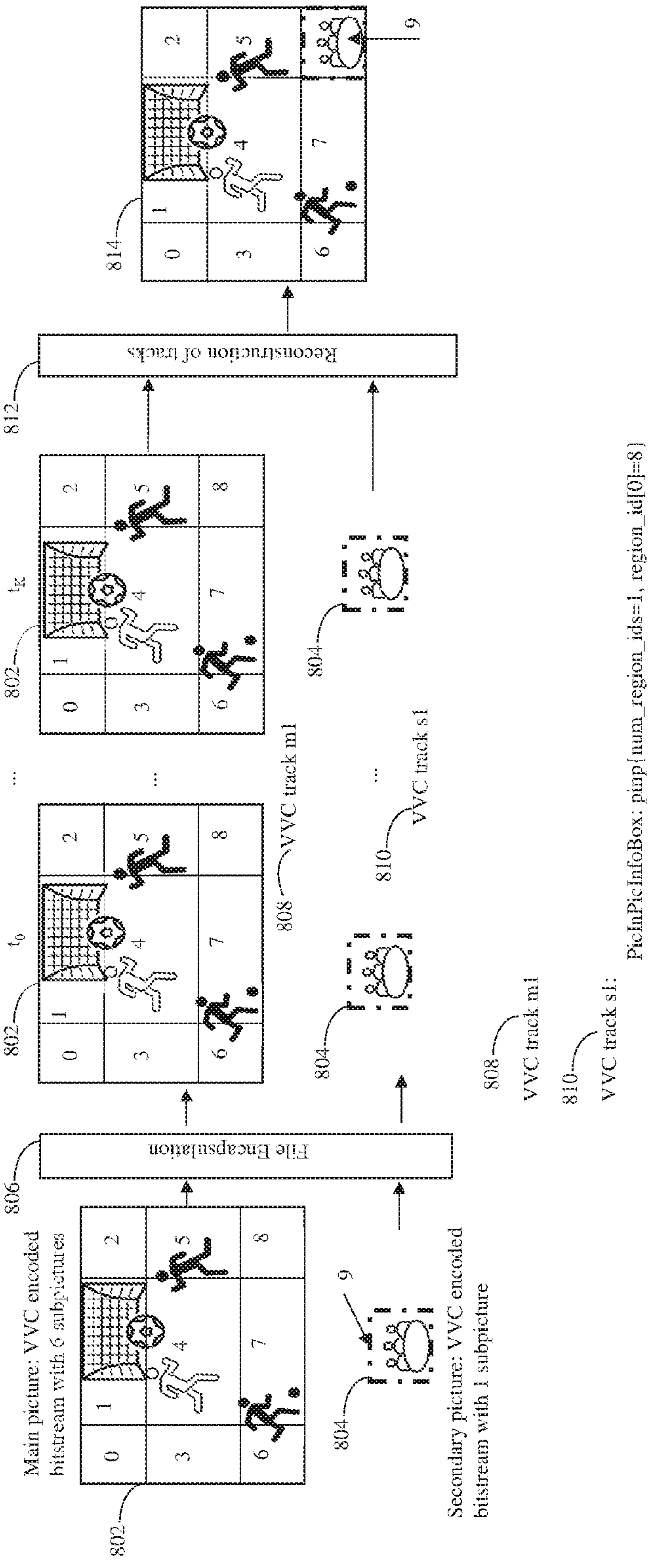
FIG. 8 illustrates an example implementation for providing a picture-in-picture feature, in accordance with an embodiment.

FIG. 8 illustrates an example implementation for providing picture-in-picture feature, in accordance with an embodiment. Referring to FIG. 8, there are 9 independent subpictures in the main picture, for example, a first picture 802, with subpicture ID's 0-8. The secondary picture, for example, a second picture 804 includes one subpicture with the subpicture ID 9. The resolution of subpicture with subpicture ID 9 in the second picture 804 matches or substantially matches with the resolution of one of the subpictures in the first picture, for example, the subpicture with subpicture ID 8 in the first picture 802. The first picture 802 may be VVC encoded into a first bitstream with 9 subpictures and the second picture 804 may be VVC encoded into a second bitstream with 1 subpicture.

The first bitstream of the first picture 802 is encapsulated 806 into a file, for example, a VVC track 808 of type 'vvc1' with track ID m1, where m1 is an unsigned integer value.

The second bitstream of the second picture 804 is encapsulated 806 into a VVC track 810 of type 'vvc1' with track ID s1, where s1 is an unsigned integer value. In an example, the VVC track 810 also includes a PicInPicInfoBox that identifies the subpicture ID of the replaced subpicture in the main track.

The VVC track 808 with track ID m1 includes the NALUMapEntry assigning a unique groupID to each NAL unit. It also additionally includes the SubpicExtractAndMergeEntry, defined above, including the groupID of those NAL units which are expected to be replaced for the picture-in-picture feature.

In one embodiment, a new track group, which may, for example, have a 4CC equal to 'pipt', may be defined that groups the first track (e.g., the VVC track 808) and second track (e.g., the VVC track 810), and also provides information about which track is the first, track and which is the second track.

In one embodiment, the new track group may include a groupID indicating which groupID from NALUMapEntry correspond to the foreground or background regions.

```
aligned(8) class PictureInPictureGroupBox extends
TrackGroupTypeBox('pipt')
{
  unsigned int(1) foreground;
  bit(7) reserved;
  unsigned int(16) groupID;
}
```

foreground equal to 1 indicates the track is the main(first) track.

groupID corresponds to the unique groupID value signal in NALUMapEntry that group NAL units used in picture-in-picture replacement.

The VVC tracks 808 and 810 may be used to select or reconstruct 812 a third bitstream to include a picture-in-picture 814. The picture-in-picture is reconstructed, for example, by replacing units of the subpicture with subpicture ID 8, included in the first picture 802, with the units of subpicture with subpicture ID 9, included in the second picture 804. The third bitstream may be provided to a player for decoding and/or playing.

Figure 9:
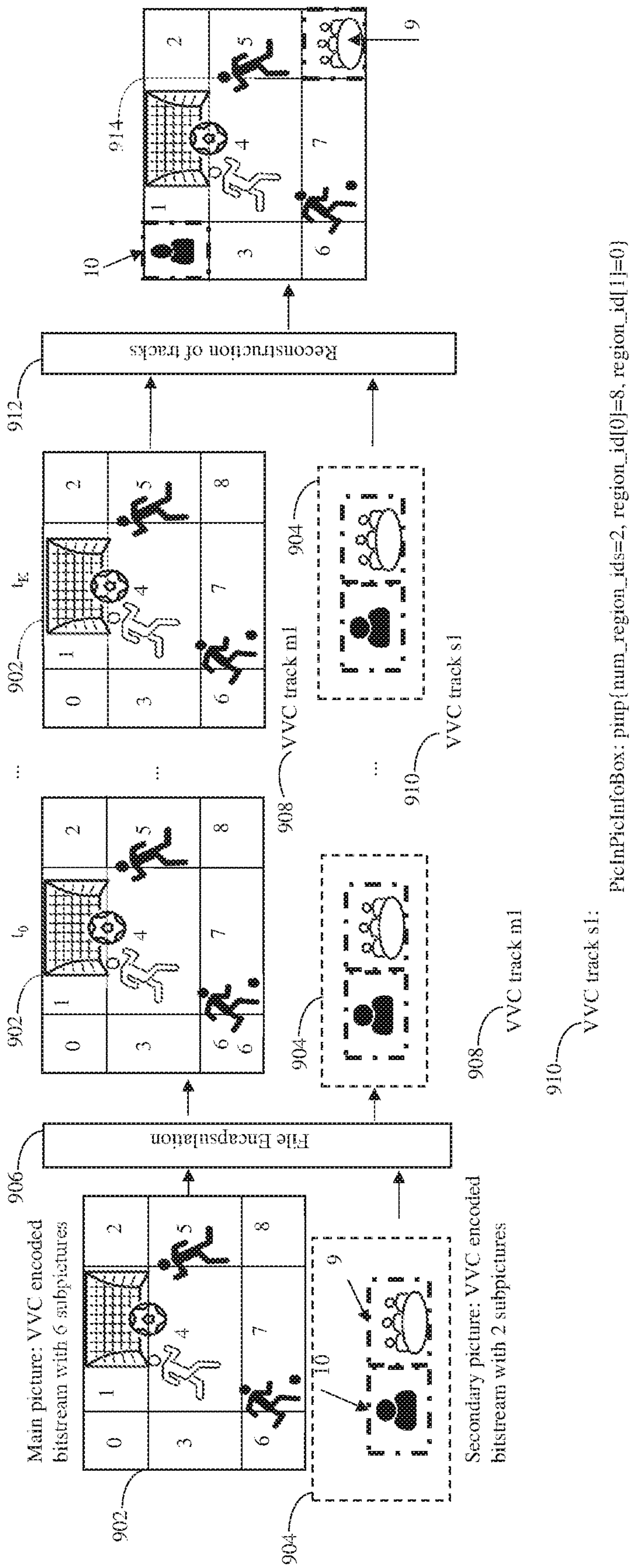
FIG. 9 illustrates an example implementation for providing a picture-in-picture feature, in accordance with another embodiment.

FIG. 9 illustrates an example implementation for providing picture-in-picture feature, in accordance with another embodiment. Referring to FIG. 9, there are 9 independent subpictures in the main picture, for example, a first picture 902, with subpicture ID's 0-8. The secondary picture, for example, a second picture 904 includes two subpictures with the subpicture ID's 9 and 10. The resolution of subpicture with the subpicture ID 9 in the second picture 904 matches or substantially matches with the resolution of one of the subpictures in the first picture, for example, the subpicture with subpicture ID 8 in the first picture 902; and the resolution of the subpicture with subpicture ID 10 in the second picture 904 matches or substantially matches with the resolution of one of the subpictures in the first picture 902, for example, the subpicture with subpicture ID 1 in the first picture 902. The first picture 902 may be VVC encoded into a first bitstream with 9 subpictures and the second picture 904 may be VVC encoded into a second bitstream with 2 subpictures.

The first bitstream of the first picture 902 is encapsulated 906 into a file, for example, a VVC track 908 of type 'vvc1' with track ID m1, where m1 is an unsigned integer value.

The second bitstream of the second picture 904 is encapsulated 906 into a VVC track 910 of type 'vvc1' with track ID s1, where s1 is an unsigned integer value. In an example, the VVC track 910 also contains a PicInPicInfoBox that identifies the subpicture IDs of the replaced subpicture in the main track.

The VVC track 908 with track ID m1 includes the NALUMapEntry assigning a unique groupID to each NAL unit. It also additionally includes the SubpicExtractAndMergeEntry, defined above, including the groupID of those NAL units which are expected to be replaced for the picture-in-picture feature.

In one embodiment, a new track group, which may, for example have a 4CC equal to 'pipt', may be defined that groups the first track (e.g., the VVC track 908) and second track (e.g., the VVC track 910), and also provides information about which track is the first, track and which is the second track.

The VVC tracks 908 and 910 may be used to reconstruct 912 a third bitstream to include a picture-in-picture 914. The picture-in-picture is reconstructed, for example, by replacing units of the subpicture with subpicture ID 8 (included in the first picture 902) with the units of subpicture with subpicture ID 9 (included in the second picture 904); and by replacing units of the subpicture with subpicture ID 0 (included in the first picture 902) with the units of subpicture with subpicture ID 10 (included in the second picture 904). The third bitstream may be provided to a player for decoding and/or playing.

Figure 10:
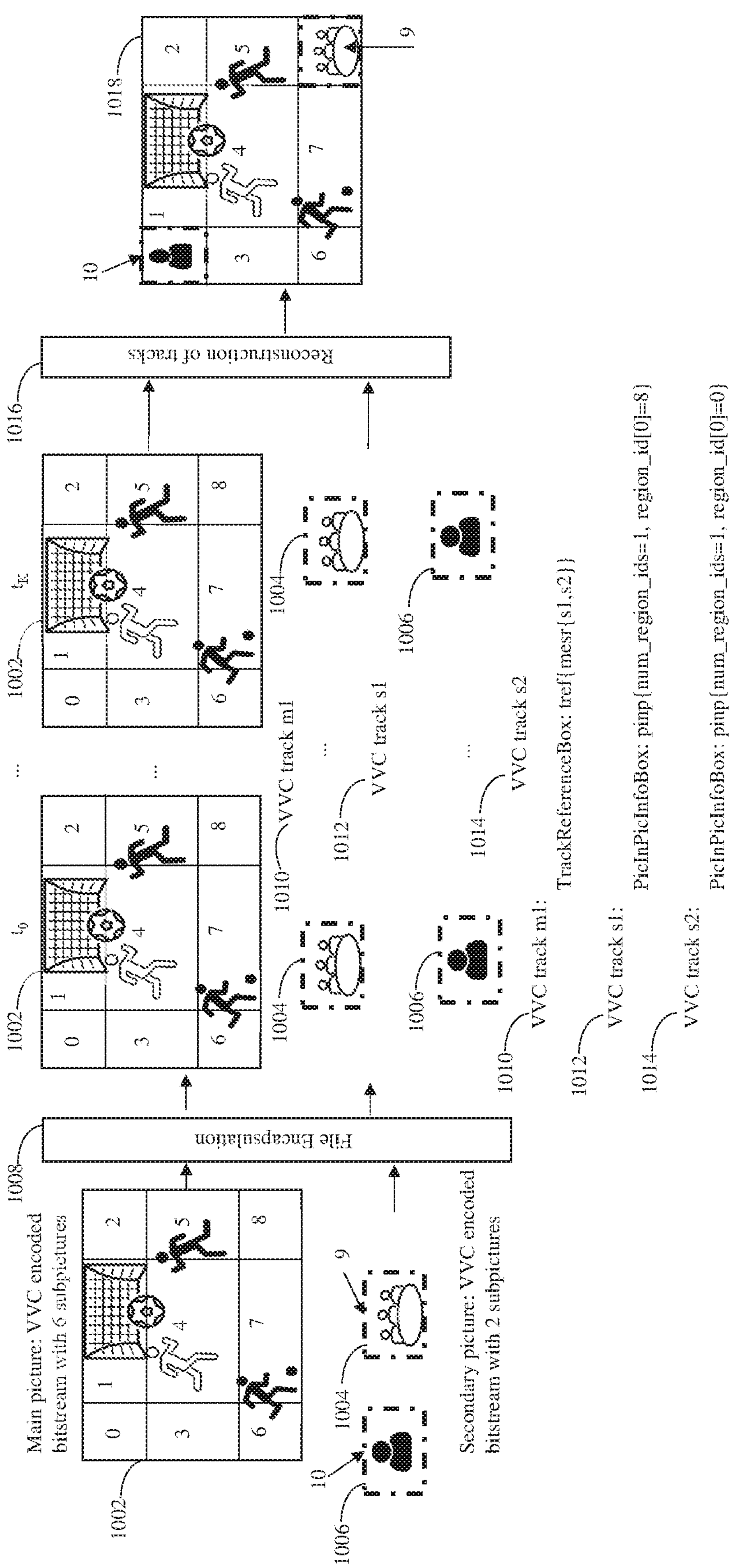
FIG. 10 illustrates an example implementation for providing picture-in-picture feature, in accordance with yet another embodiment.

FIG. 10 illustrates an example implementation for providing picture-in-picture feature, in accordance with yet another embodiment. Referring to FIG. 10, there are 9 independent subpictures in the main picture, for example, a first picture 1002, with subpicture ID's 0-8. In this example implementation, there are two secondary pictures, for example, a second picture 1004, which includes a subpicture with the subpicture ID 9; and a third picture 1006, which includes a subpicture with the subpicture ID 10. The resolution of subpicture with the subpicture ID 9 in the second picture 1004 matches or substantially matches with the resolution of one of the subpictures in the first picture, for example, the subpicture with subpicture ID 8 in the first picture 1002; and the resolution of the subpicture with subpicture ID 10 in the second picture 1004 matches or substantially matches with the resolution of one of the subpictures in the first picture 1002, for example, the subpicture with subpicture ID 0 in the first picture 1002. The first picture 1004 may be VVC encoded into a first bitstream with 9 subpictures, the second picture 1004 may be VVC encoded into a second bitstream with 1 subpicture, and the third picture 1006 may be VVC encoded into a third bitstream with 1 subpicture.

The first bitstream of the first picture 1002 is encapsulated 1008 into a file, for example, a VVC track 1010 of type 'vvc1' with track ID m1, where m1 is an unsigned integer value.

The second bitstream of the second picture 1004 is encapsulated 1008 into a VVC track 1012 of type 'vvc1' with track ID s1, and the third bitstream of the third picture 1006 is encapsulated 1008 into a VVC track 1014 of type 'vvc1' with track ID s2, where s1 and s2 are unsigned integer values. In an example, the VVC tracks 1012 and 1014 also include a PicInPicInfoBox that identify the subpicture IDs of the replaced subpictures in the main track.

The VVC track 1010 with track ID m1 includes the NALUMapEntry assigning a unique groupID to each NAL unit. It also additionally includes the SubpicExtractAndMergeEntry, defined above, including the groupID of those NAL units which are expected to be replaced for the picture-in-picture feature. In an example embodiment, the VVC track 1010 comprises a 'mesr' track reference, as described above, which includes the track IDs s1 and s2 that are mapped to groupID values included in SubpicExtractAndMergeEntry.

In one embodiment, a new track group, which may, for example, have a 4CC equal to 'pipt', may be defined that groups a first track (e.g., the VVC track 1010), a second track (e.g., the VVC track 1012), a third track (e.g., the VVC track 1014) and also provides information about which track is the first track, which track is the second track, and which is the third track.

The VVC tracks 1010, 1012, and 1014 may be used to reconstruct 1016 a fourth bitstream to include a picture-in-picture 1018. The picture-in-picture is reconstructed, for example, by replacing units of the subpicture with subpicture ID 8 (included in the first picture 1002) with the units of subpicture with subpicture ID 9 (included in the second picture 1004); and by replacing units of the subpicture with subpicture ID 0 (included in the first picture 1002) with the units of subpicture with subpicture ID 10 (included in the third picture 1006). The third bitstream may be provided to a player for decoding and/or playing.

In an embodiment, the picture-in-picture solution of PicInPicInfoBox presented in the TuC document as discussed above may be modified as described in following paragraphs.

In an embodiment, the PicInPicInfoBox present in the sample entry of a PiP video track is modified to a sample group description entry PicInPicInfoEntry. This change enables referencing PicInPicInfoEntry from a 'nalm' sample group.

In an embodiment, region_id_type is introduced in PicInPicInfoEntry.

In an embodiment, when region_id_type takes the value 0, then region_id[i] present in PicInPicInfoEntry indicates Subpicture IDs.

In an embodiment, when region_id_type takes the value 1, then region_id[i] present in PicInPicInfoEntry indicates groupID value in the NAL unit map sample group and the following is specified:

In an embodiment, the main track may include a 'nalm' sample group with grouping_type_parameter equal to 'pinp' indicating the NAL units in the main track that may be replaced by the NAL units in the PIP track with the same groupID values.

In an embodiment, the PiP track includes a 'nalm' sample group with grouping_type_parameter equal to 'pinp' indicating the NAL units in the PiP track that are used to replace the NAL units in the main track with the same groupID values. This allows the replacement of only the NAL units that is used for decoding without the unnecessary non-VCL NAL units (for example, SPSs) of the PiP track.

In an embodiment, when PicInPicInfoEntry is present in a PiP video track it indicates that the coded video data units representing the target PiP region in the main video can be replaced with the corresponding video data units of the PiP video. In this embodiment, it is required that the same video codec is used for coding of the PiP video and the main video. The absence of this sample group indicates that it is unknown whether such replacement is possible.

In an example embodiment the syntax of PicInPicInfoEntry in ISOBMFF is defined as follows:

```
class PicInPicInfoEntry( ) extends VisualSampleGroupEntry ('pinp'){
   unsigned int(8) region_id_type;
   unsigned int(8) num_region_ids;
   for(i=0; i<num_region_ids; i++)
      unsigned int(16) region_id[i];
}
```

In an example embodiment, the semantics of the fields in PicInPicInfoEntry is defined as below.

In an embodiment, when this sample group is present, the player may choose to replace the coded video data units representing the target PiP region in the main video with the corresponding coded video data units of the PiP video before sending to the video decoder for decoding. In this case, for a particular picture in the main video, the corresponding video data units of the PiP video are all the coded video data units in the decoding-time-synchronized sample in the PiP video track.

In an embodiment, region_id_type indicates the type for the value taken by the region_id.

In an embodiment, when region_id_type is equal to 0, the region IDs are subpicture IDs.

In an embodiment, when region_id_type is equal to 1, the region IDs are the groupID value in the NAL unit map sample group for the NAL units that may be replaced by the NAL units of the PiP track.

In an embodiment, region_id_type is not present in the syntax and the region IDs are inferred to be the groupID value in the NAL unit map sample group for the NAL units that may be replaced by the NAL units of the PiP track.

In an embodiment, region_id_type values greater than 1 are reserved.

In an embodiment, num_region_ids specifies the number of the following region_id[i] fields.

In an embodiment, region_id[i] specifies the i-th ID for the coded video data units representing the target picture-in-picture region.

In an embodiment, when region_id_type is equal to 1, the main video track has a 'nalm' sample group with grouping_type_parameter equal to 'pinp' indicating the NAL units in the main track that may be replaced by the NAL units in the PiP track with the same groupID values.

In an embodiment, when region_id_type is equal to 1 and num_region_ids is equal to 1, 'nalm' sample group may not be present in the PiP track and all the NAL units of the PIP track are implicitly considered to have groupID equal to region_id [0].

In an embodiment, when region_id_type is equal to 1 and num_region_ids is greater than 1, a 'nalm' sample group with grouping_type_parameter equal to 'pinp' is present in the PiP track and provide a mapping of groupID values to NAL units.

A method, entity, or an apparatus is defined which:

writes into a manifest file for example a DASH MPD file
- a first representation of a first adaptation set for the main video track.
- a second representation of a second adaptation set for the PiP video track wherein the method, entity or apparatus is further caused to include the following information in the manifest file:
- the picture-in-picture relationship between the said first representation of a first adaptation set and the said second representation of a second adaptation set either at the adaptation set level or at the representation level or both
- region_id_type value which indicates the type for the value taken by the region_id; when region_id_type is equal to 1, the region IDs are the groupID value in the NAL unit map sample group for the NAL units that may be replaced by the NAL units of the PiP representation, when region_id_type is equal to 0, the region IDs are subpicture IDs.
- region_id_type value indicated at the at the adaptation set level or at the representation level or both the region_id value which specifies the i-th ID for the coded video data units representing the target picture-in-picture region in the said representation containing the main video.

Embodiments have been described with reference to VVC. It needs to be understood that embodiments may be similarly realized with any other video codec. For example, rather than VVC subpictures, embodiments may be similarly realized with reference to any form(s) of isolated regions, such as motion-constrained tile sets. In another example, rather than referring to NAL units, embodiments may be similarly realized with reference to any elementary data units of the video bitstream, such as Open Bitstream Units (OBUs) of AV1, or the like.

Figure 11:
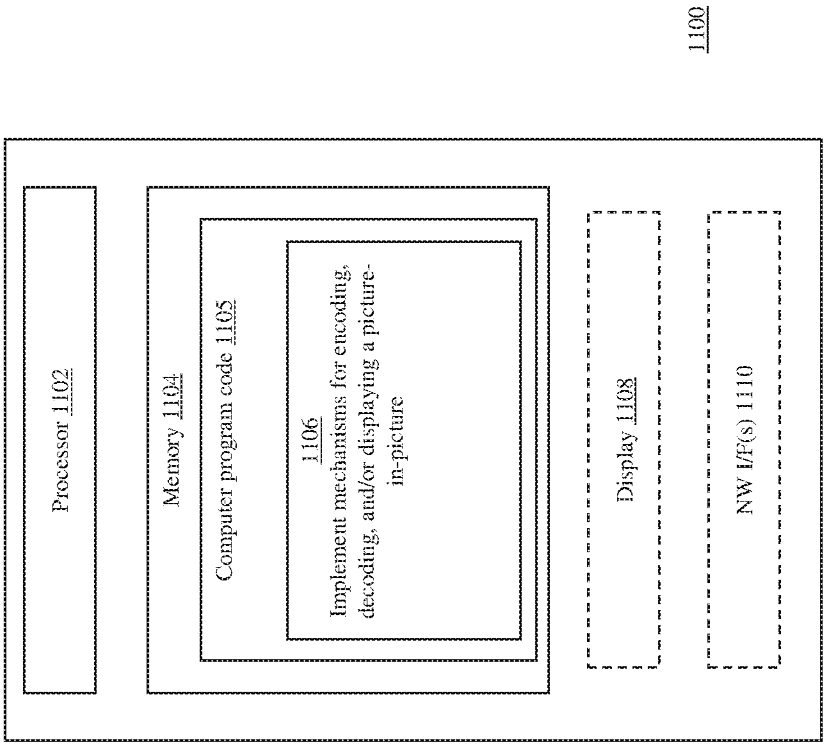
FIG. 11 is an example apparatus caused to implement mechanisms for encoding, decoding, and/or displaying a picture-in-picture, in accordance with an embodiment.

FIG. 11 is an example apparatus 1100, which may be implemented in hardware, configured to implement mechanisms for encoding, decoding, and/or displaying a picture-in-picture, based on the examples described herein. The apparatus 1100 comprises a processor 1102, at least one non-transitory memory 1104 including computer program code 1105, wherein the at least one memory 1104 and the computer program code 1105 are configured to, with the at least one processor 1102, cause the apparatus to implement mechanisms for encoding, decoding, and/or displaying a picture-in-picture 1106. The apparatus 1100 optionally includes a display 1108 that may be used to display content during rendering. The apparatus 1100 optionally includes one or more network (NW) interfaces (I/F(s)) 1110. The NW I/F(s) 1110 may be wired and/or wireless and communicate over the Internet/other network(s) via any communication technique. The NW I/F(s) 1110 may comprise one or more transmitters and one or more receivers. The N/W I/F(s) 1110 may comprise standard well-known components such as an amplifier, filter, frequency-converter, (de) modulator, and encoder/decoder circuitry(ies) and one or more antennas.

The apparatus 1100 may be a remote, virtual or cloud apparatus. The apparatus 1100 may be either a coder or a decoder, or both a coder and a decoder. The at least one memory 1104 may be implemented using any suitable data storage technology, such as semiconductor based memory devices, flash memory, magnetic memory devices and systems, optical memory devices and systems, fixed memory and removable memory. The at least one memory 1104 may comprise a database for storing data. The apparatus 1100 need not comprise each of the features mentioned, or may comprise other features as well. The apparatus 1100 may correspond to or be another embodiment of the apparatus 50 shown in FIG. 1 and FIG. 2, or any of the apparatuses shown in FIG. 3. The apparatus 1100 may correspond to or be another embodiment of the apparatuses shown in FIG. 10, including UE 110, RAN node 170, or network element(s) 190.

Figure 12:
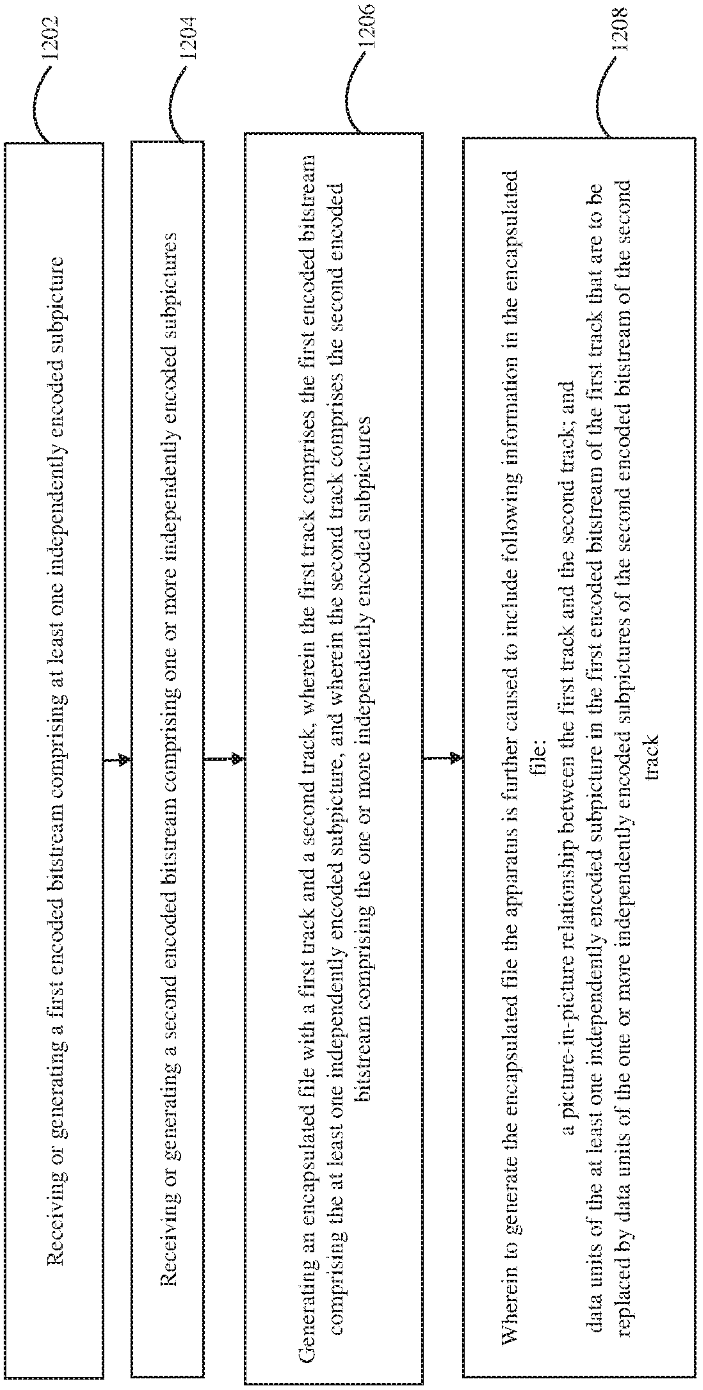
FIG. 12 is an example method for encoding a picture-in-picture, in accordance with an embodiment.

FIG. 12 is an example method 1200 for encoding a picture-in-picture, in accordance with an embodiment. As shown in block 1106 of FIG. 11, the apparatus 1100 includes means, such as the processing circuitry 1102 or the like, for implementing mechanisms for encoding a picture-in-picture. At 1202, the method 1200 includes receiving or generating a first encoded bitstream comprising at least one independently encoded subpicture. At 1204, the method 1200 includes receiving or generating a second encoded bitstream comprising one or more independently encoded subpictures. In an example embodiment, resolution of one or more subpictures in the second encoded bitstream is same or substantially same as resolution of corresponding one or more subpictures in the first encoded bitstream. At 1206, the method 1200 includes generating an encapsulated file with a first track and a second track. The first track includes the first encoded bitstream including the at least one independently encoded subpicture, and the second track includes the second encoded bitstream including the one or more independently encoded subpictures. At 1208, the method 1200 includes wherein to generate the encapsulated file the apparatus is further caused to include following information in the encapsulated file:

- a picture-in-picture relationship between the first track and the second track; and
- data units of the at least one independently encoded subpicture in the first encoded bitstream of the first track that are to be replaced by data units of the one or more independently coded subpictures of the second encoded bitstream of the second track.

Figure 13:
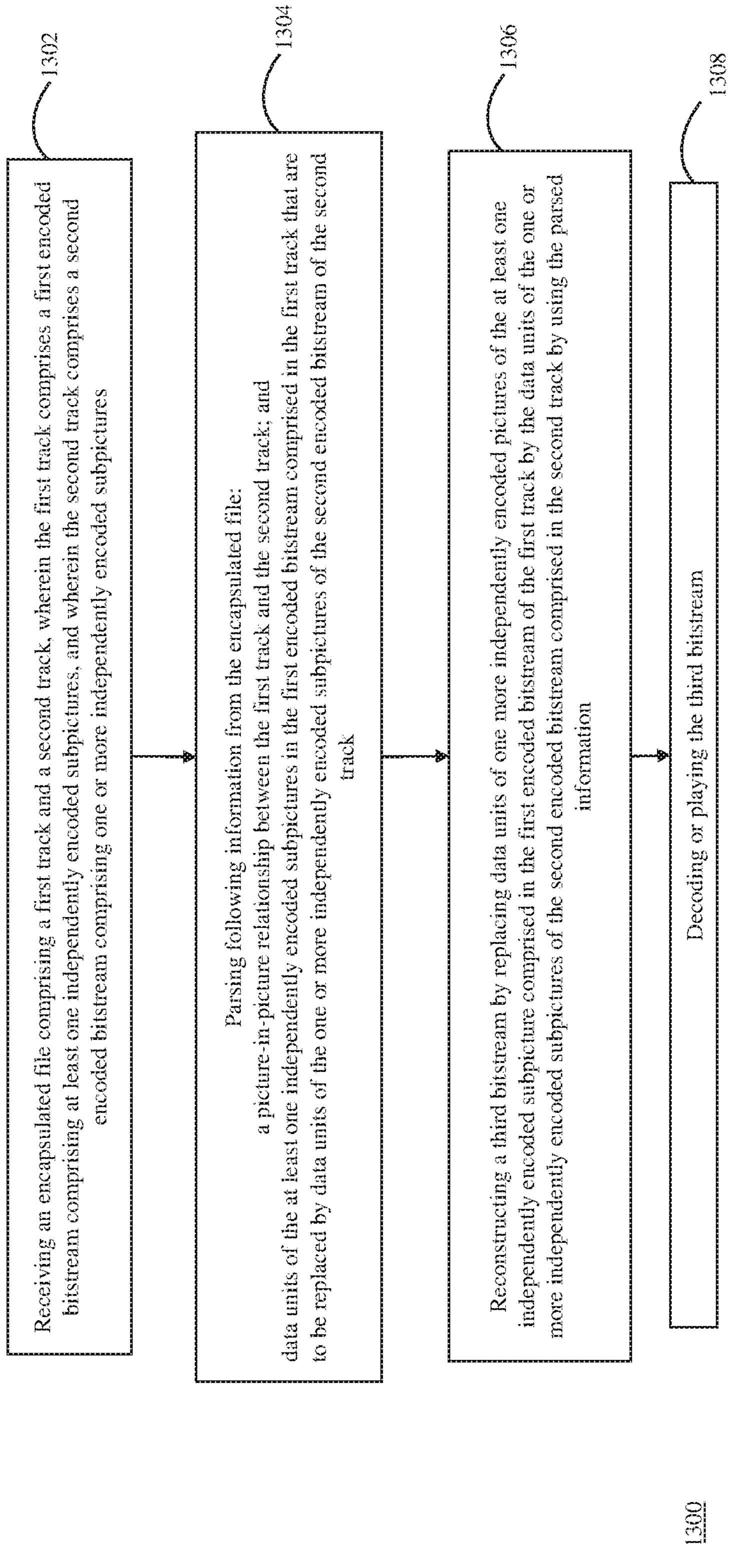
FIG. 13 is an example method for decoding or displaying a picture-in-picture, in accordance with another embodiment.

FIG. 13 is an example method 1300 for decoding or displaying a picture-in-picture, in accordance with another embodiment. As shown in block 1106 of FIG. 11, the apparatus 1100 includes means, such as the processing circuitry 1102 or the like, for implementing mechanisms for decoding or displaying a picture-in-picture. At 1302, the method 1300 includes receiving an encapsulated file including a first track and a second track. The first track includes a first encoded bitstream including at least one independently encoded subpicture, and the second track includes a second encoded bitstream including one or more independently encoded subpictures. At 1304, the method 1300 includes parsing following information from the encapsulated file:

- a picture-in-picture relationship between the first track and the second track; and
- data units of the at least one independently coded subpicture in the first encoded bitstream included in the first track that are to be replaced by data units of the one or more independently encoded subpictures of the second encoded bitstream of the second track.

At 1306, the method 1300 includes reconstructing a third bitstream by replacing data units of one more independently encoded pictures of the at least one independently encoded subpicture included in the first encoded bitstream of the first track by the data units of the one or more independently encoded subpictures of the second encoded bitstream included in the second track by using the parsed information. At 1308, the method 1300 includes decoding or playing the third bitstream. In an embodiment, playing includes displaying or rendering the third bitstream.

Figure 14:
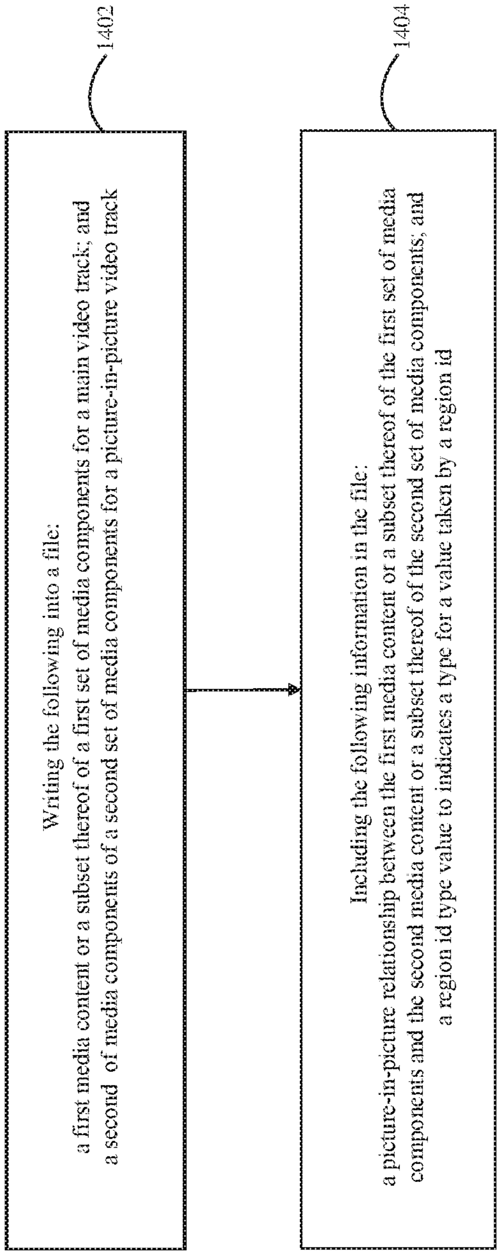
FIG. 14 is an example method for encoding a picture-in-picture, in accordance with another embodiment.

FIG. 14 is an example method 1400 for encoding a picture-in-picture, in accordance with another embodiment. As shown in block 1106 of FIG. 11, the apparatus 1100 includes means, such as the processing circuitry 1102 or the like, for implementing mechanisms for decoding the picture-in-picture. At 1402, the method 1400 includes writing the following into a file:

- a first media content or a subset thereof of a first set of media components for a main video track; and
- a second of media components of a second set of media components for a picture-in-picture video track.

At 1404, the method 1400 includes including the following information in the file:

- a picture-in-picture relationship between the first media content or a subset thereof of the first set of media components and the second media content or a subset thereof of the second set of media components; and
- a region id type value to indicates a type for a value taken by a region id.

In an embodiment:

the file comprises a manifest file;

the first set of media components comprise a first adaptation set;

the first media content comprises a first representation of the first adaptation set;

the second set of media components comprise a second adaptation set; or the second media content comprises a second representation of the second adaptation set.

Figure 15:
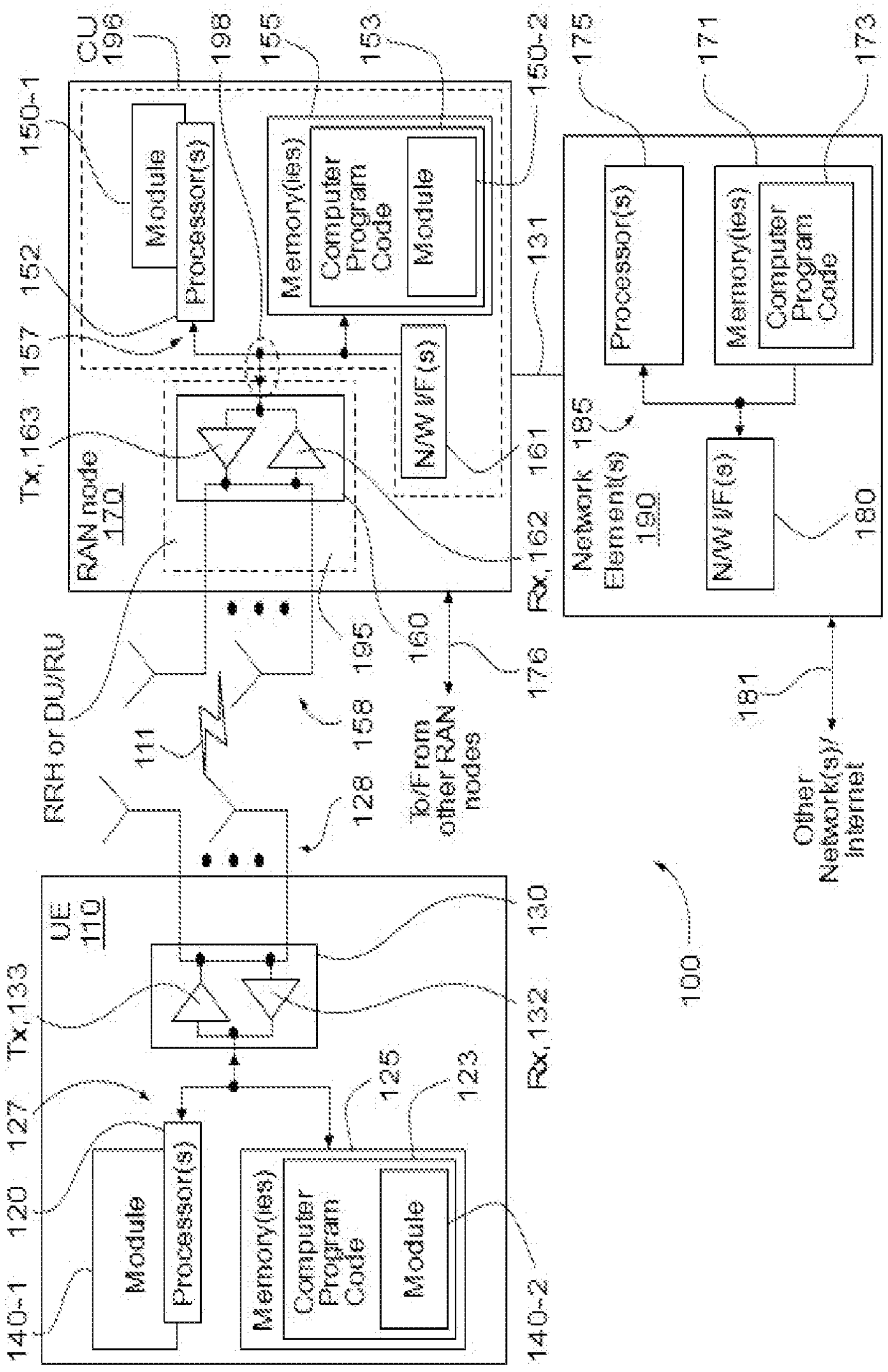
FIG. 15 is a block diagram of one possible and non-limiting system in which the example embodiments may be practiced.

Turning to FIG. 15, this figure shows a block diagram of one possible and non-limiting system in which the example embodiments may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), SDAP and PDCP protocols f51 of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, for example, as part of a RU, but some examples of this may have the transceiver 160 as part of a separate RU, for example, under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, for example, link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (for example, a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So when there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (for example, the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, for example, an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

One or more of modules 140-1, 140-2, 150-1, and 150-2 may be configured to implement mechanisms for encoding, decoding, and/or displaying a picture-in-picture based on the examples described herein. Computer program code 173 may also be configured to implement mechanisms for encoding, decoding, and/or displaying a picture-in-picture based on the examples described herein.

As described above, FIGS. 12 to 14 include a flowchart of an apparatus (e.g. 50, 600, or 1100), method, and computer program product according to certain example embodiments. It will be understood that each block of the flowchart(s), and combinations of blocks in the flowchart(s), may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory (e.g. 58, 125, 604 or 1104) of an apparatus employing an embodiment and executed by processing circuitry (e.g. 56, 120, 602 or 1102) of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart(s) of FIGS. 12 to 14. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Accordingly, the description is intended to embrace all such alternatives, modifications and variances which fall within the scope of the appended claims. Although specific terms are employed herein, they are used in a generic and descriptive sense only and not for purposes of limitation.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:

at least one processor; and at least one memory including computer program code;

wherein the at least one memory and the computer program code are configured to, with the at least one processor, cause the apparatus at least to perform:

writing into a file:

a first media content or a subset thereof of a first set of media components for a main video track; and a second media content or a subset thereof of a second set of media components for a picture-in-picture video track; and including following information in the file:

a picture-in-picture relationship between the first media content or a subset thereof of the first set of media components and the second media content or a subset thereof of the second set of media components; and a region id type value to indicate a type for a value taken by a region id, wherein when a region id type is equal to 1, region IDs comprise a group ID value in an abstraction layer unit map sample group for abstraction layer units that are intended to be replaced by the abstraction layer units of a picture-in-picture representation.

2. The apparatus of claim 1, wherein:

the file comprises a manifest file;

the first set of media components comprise a first adaptation set;

the first media content comprises a first representation of the first adaptation set;

the second set of media components comprise a second adaptation set; or the second media content comprises a second representation of the second adaptation set.

3. The apparatus of claim 1, wherein when region id type is equal to 0, region IDs comprise subpicture IDs.

4. The apparatus of claim 1, wherein the apparatus is further caused to include following in the file:

a region id value to specify an i-th ID for encoded video data units representing a target picture-in-picture region in the main video track.

5. A method comprising:

writing the following into a file:

a first media content or a subset thereof of a first set of media components for a main video track; and a second media content or a subset thereof of a second set of media components for a picture-in-picture video track; and including following information in the file:

a picture-in-picture relationship between the first media content or a subset thereof of the first set of media components and the second media content or a subset thereof of the second set of media components; and a region id type value to indicate a type for a value taken by a region id, wherein when a region id type is equal to 1, region IDs comprise a group ID value in an abstraction layer unit map sample group for abstraction layer units that are intended to be replaced by the abstraction layer units of a picture-in-picture representation.

6. The method of claim 5, wherein:

the file comprises a manifest file;

the first set of media components comprise a first adaptation set;

the first media content comprises a first representation of the first adaptation set;

the second set of media components comprise a second adaptation set; or the second media content comprises a second representation of the second adaptation set.

7. The method of claim 5, wherein when region id type is equal to 0, region IDs comprise subpicture IDs.

8. The method of claim 5 further comprising including following in the file:

a region id value to specify an i-th ID for encoded video data units representing a target picture-in-picture region in the main video track.

9. An apparatus comprising:

at least one processor; and at least one memory including computer program code;

wherein the at least one memory and the computer program code are configured to, with the at least one processor, cause the apparatus at least to perform:

receiving a file comprising a first media content or a subset thereof of a first set of media components for a main video track and a second media content or a subset thereof of a second set of media components for a picture-in-picture video track;

parsing following information from the file:

a picture-in-picture relationship between the first media content or a subset thereof of the first set of media components and the second media content or a subset thereof of the second set of media components; and a region id type value to indicate a type for a value taken by a region id, wherein when a region id type is equal to 1, region IDs comprise a group ID value in an abstraction layer unit map sample group for abstraction layer units that are intended to be replaced by the abstraction layer units of a picture-in-picture representation; and performing a picture-in-picture replacement based on the picture-in-picture relationship.

10. The apparatus of claim 9, wherein:

the file comprises a manifest file;

the first set of media components comprise a first adaptation set;

the first media content comprises a first representation of the first adaptation set;

the second set of media components comprise a second adaptation set; or the second media content comprises a second representation of the second adaptation set.

11. The apparatus of claim 9, wherein when region id type is equal to 0, region IDs comprise subpicture IDs.

12. The apparatus of claim 9, wherein the file further comprises:

a region id value to specify an i-th ID for encoded video data units representing a target picture-in-picture region in the main video track.

13. A method comprising:

receiving a file comprising a first media content or a subset thereof of a first set of media components for a main video track; and a second media content or a subset thereof of a second set of media components for a picture-in-picture video track;

parsing following information from the file:

a picture-in-picture relationship between the first media content or a subset thereof of the first set of media components and the second media content or a subset thereof of the second set of media components; and a region id type value to indicate a type for a value taken by a region id, wherein when a region id type is equal to 1, region IDs comprise a group ID value in an abstraction layer unit map sample group for abstraction layer units that are intended to be replaced by the abstraction layer units of a picture-in-picture representation; and performing a picture-in-picture replacement based on the picture-in-picture relationship.

14. The method of claim 13, wherein:

the file comprises a manifest file;

the first set of media components comprise a first adaptation set;

the first media content comprises a first representation of the first adaptation set;

the second set of media components comprise a second adaptation set; or the second media content comprises a second representation of the second adaptation set.

15. The method of claim 13, wherein when region id type is equal to 0, region IDs comprise subpicture IDs.

16. The method of claim 13, wherein the file further comprises:

a region id value to specify an i-th ID for encoded video data units representing a target picture-in-picture region in the main video track.

* * * * *